US012672046B2

(12) United States Patent
Zhao et al.

(10) Patent No.: US 12,672,046 B2
(45) Date of Patent: Jun. 30, 2026

(54) COMMUNICATION METHOD AND COMMUNICATION APPARATUS

(71) Applicant: HUAWEI TECHNOLOGIES CO., LTD., Shenzhen (CN)

(72) Inventors: Mingyu Zhao, Shanghai (CN); Xueqiang Yan, Shanghai (CN); Jianjun Wu, Shanghai (CN); Xueli An, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 18/323,222

(22) Filed: May 24, 2023

(65) Prior Publication Data

US 2023/0300716 A1 Sep. 21, 2023

Related U.S. Application Data

(63) Continuation of application No. PCT/CN2021/106736, filed on Jul. 16, 2021.

(30) Foreign Application Priority Data

Nov. 24, 2020 (CN) .......................... 202011331897.8

(51) Int. Cl.
*H04W 40/24* (2009.01)
*H04W 40/20* (2009.01)
(52) U.S. Cl.
CPC ......... *H04W 40/248* (2013.01); *H04W 40/20* (2013.01)

(58) Field of Classification Search
None
See application file for complete search history.

(56) References Cited

U.S. PATENT DOCUMENTS

| | | | | |
|---|---|---|---|---|
| 2009/0198799 A1* | 8/2009 | Shi | .......................... | H04L 67/51 |
| | | | | 709/242 |
| 2016/0150366 A1* | 5/2016 | Miller | ..................... | H04W 4/08 |
| | | | | 455/456.4 |
| 2021/0176207 A1* | 6/2021 | Maria | ................. | H04L 61/2514 |
| 2022/0408243 A1* | 12/2022 | Mattsson | .............. | H04W 12/40 |

FOREIGN PATENT DOCUMENTS

CN 101860474 A 10/2010

* cited by examiner

*Primary Examiner* — Shukri Taha
(74) *Attorney, Agent, or Firm* — Leydig, Voit & Mayer, Ltd.

(57) ABSTRACT

A communication method and a communication system. The method may include: A first network device generates a node identifier, where the node identifier includes a global part and a local part, and the global part is determined based on geographical location information of a region covered by a second network device in which a node is located, for example, the second network device may be a device in mobile edge computing (MEC), and the local part is determined based on identity information of a terminal device associated with the node. The first network device sends the node identifier to the terminal device. In embodiments of this application, the geographical location information is introduced into the node identifier, so that a node that is identified nearby in space can also be short-distance in a physical network, thereby reducing an end-to-end latency.

18 Claims, 12 Drawing Sheets

700

1100

1300

COMMUNICATION METHOD AND COMMUNICATION APPARATUS

CROSS-REFERENCE TO RELATED APPLICATIONS

This application is a continuation of International Application No. PCT/CN2021/106736, filed on Jul. 16, 2021, which claims priority to Chinese Patent Application No. 202011331897.8, filed on Nov. 24, 2020. The disclosures of the aforementioned applications are hereby incorporated by reference in their entireties.

TECHNICAL FIELD

This application relates to the communication field, and more specifically, to a communication method and a communication apparatus.

BACKGROUND

In a conventional distributed hash table (DHT) protocol, a node identifier of each node is randomly allocated, and a location relationship between nodes is not considered in a process of allocating the node identifier. Consequently, a topology structure of an underlay network is inconsistent with a topology structure of an overlay network overlaid on the underlay network, and an end-to-end latency of the overlay network is high.

SUMMARY

This application provides a communication method and a communication apparatus, to reduce an end-to-end latency.

According to a first aspect, a communication method is provided. The method includes: A first network device generates a node identifier, where the node identifier includes a global part and a local part, the global part is determined based on geographical location information of a region covered by a second network device in which a node is located, and the local part is determined based on identity information of a terminal device associated with the node; and the first network device sends the node identifier to the terminal device.

In an embodiment, the second network device is a device in mobile edge computing (MEC).

Based on the foregoing technical solution, the global part of the node identifier is determined based on the geographical location information of the region covered by the second network device in which the node is located, and the geographical location information may be introduced into the node identifier, so that a node that is nearby in a logical network is also short-distance in a physical network, thereby optimizing routing and reducing an end-to-end latency.

With reference to the first aspect, in some embodiments of the first aspect, the geographical location information of the region includes geographical location information of the second network device, and the geographical location information of the second network device includes one or more of the following: a mobile country code, a mobile network code, an identifier of a geographical region in which the second network device is located, an identifier of a set to which the second network device belongs, and a serial number of the second network device in the set.

Based on the foregoing solution, the geographical location information of the second network device is used as the global part of the node identifier, and a centralized landmark server does not need to be introduced. Therefore, a risk of a single-point failure and a distributed denial of service attack can be avoided.

With reference to the first aspect, in some embodiments of the first aspect, the geographical location information of the region is determined based on geographical location information of N access network devices that meet a preset condition in the region, and the preset condition is that the access network device always exists within a predefined time, where N is a positive integer.

Based on the foregoing solution, the geographical location information of the plurality of access network devices in the region covered by the second network device is used as the global part of the node identifier, and a centralized landmark server does not need to be introduced. Therefore, a risk of a single-point failure and a distributed denial of service attack can be avoided.

With reference to the first aspect, in some embodiments of the first aspect, the geographical location information of the region includes geographical coordinates, and the geographical coordinates include an average value of geographical coordinates of the N access network devices that meet the preset condition.

Based on the foregoing technical solution, the geographical coordinates of the plurality of access network devices in the region covered by the second network device are used as the global part of the node identifier, and a centralized landmark server does not need to be introduced. Therefore, a risk of a single-point failure and a distributed denial of service attack can be avoided.

With reference to the first aspect, in some embodiments of the first aspect, the method is applied to a communication system including a network service node (NSN) and a user service node (USN), the NSN communicates with the USN through an external interface, the NSN includes an authentication functional entity and/or a session management functional entity, the USN is associated with the terminal device, the USN includes the following functional entities: a data forwarding functional entity, a session management functional entity, and a user data storage functional entity, and the functional entities included in the USN communicate with each other through an internal interface; and the node is the USN, and the node identifier is an identifier of the USN node.

Based on the foregoing technical solution, the solution for generating the node identifier provided in embodiments of this application may be applied to a user-centric network architecture.

With reference to the first aspect, in some embodiments of the first aspect, the identifier of the USN node is used in a process of identification between the terminal device and the USN node.

Based on the foregoing technical solution, because the identifier of the USN node includes the global part that can reflect a geographical location of the USN, using the identifier of the USN node in the process of identification between the USN node and the terminal device may facilitate addressing of the USN node.

With reference to the first aspect, in some embodiments of the first aspect, the global part of the node identifier identifies the second network device.

Based on the foregoing technical solution, the second network device to which the terminal device belongs can be determined based on the global part of the node identifier. For example, when the second network device is a device in MEC, the MEC in which the terminal device is located may be determined based on the global part of the node identifier.

With reference to the first aspect, in some embodiments of the first aspect, the identity information of the terminal device includes any one of the following: an internet protocol (IP) address, a port number, an application identifier (APP ID), an international mobile subscriber identity (IMSI), a subscription permanent identifier (SUPI), and a phone number.

According to a second aspect, a communication apparatus is provided, including a transceiver unit and a processing unit. The processing unit is configured to generate a node identifier. The node identifier includes a global part and a local part, the global part is determined based on geographical location information of a region covered by a second network device in which a node is located, and the local part is determined based on identity information of a terminal device associated with the node; and the transceiver unit is configured to send the node identifier to the terminal device.

With reference to the second aspect, in some embodiments of the second aspect, the geographical location information of the region includes geographical location information of the second network device, and the geographical location information of the second network device includes one or more of the following: a mobile country code, a mobile network code, an identifier of a geographical region in which the second network device is located, an identifier of a set to which the second network device belongs, and a serial number of the second network device in the set.

With reference to the second aspect, in some embodiments of the second aspect, the geographical location information of the region is determined based on geographical location information of N access network devices that meet a preset condition in the region, and the preset condition is that the access network device always exists within a predefined time, where N is a positive integer.

With reference to the second aspect, in some embodiments of the second aspect, the geographical location information of the region includes geographical coordinates, and the geographical coordinates include an average value of geographical coordinates of the N access network devices that meet the preset condition.

With reference to the second aspect, in some embodiments of the second aspect, the communication apparatus is an NSN in a communication system including an NSN and a USN, the NSN communicates with the USN through an external interface, the NSN includes an authentication functional entity and/or a session management functional entity, the USN is associated with the terminal device, the USN includes the following functional entities: a data forwarding functional entity, a session management functional entity, and a user data storage functional entity, and the functional entities included in the USN communicate with each other through an internal interface; and the node is the USN, and the node identifier is an identifier of the USN node.

With reference to the second aspect, in some embodiments of the second aspect, the identifier of the USN node is used in a process of identification between the terminal device and the USN node.

With reference to the second aspect, in some embodiments of the second aspect, the node identifier identifies the second network device.

With reference to the second aspect, in some embodiments of the second aspect, the identity information of the terminal device includes any one of the following: an internet protocol IP address, a port number, an application identifier, an international mobile subscriber identity, a subscription permanent identifier, and a phone number.

According to a third aspect, a communication apparatus is provided, including a processor. The processor is coupled to a memory, and may be configured to execute instructions in the memory, to implement the method in any one of the first aspect or the embodiments of the first aspect. Optionally, the communication apparatus further includes a memory. Optionally, the communication apparatus further includes a communication interface, and the processor is coupled to the communication interface.

In an embodiment, the communication apparatus is a first network device. When the communication apparatus is the first network device, the communication interface may be a transceiver or an input/output interface.

In another embodiment, the communication apparatus is a chip configured in a first network device. When the communication apparatus is the chip configured in the first network device, the communication interface may be an input/output interface.

Optionally, the transceiver may be a transceiver circuit. Optionally, the input/output interface may be an input/output circuit.

According to a fourth aspect, a processor is provided, including an input circuit, an output circuit, and a processing circuit. The processing circuit is configured to: receive a signal by using the input circuit, and transmit a signal by using the output circuit, so that the processor performs the method according to any one of the first aspect and the embodiments of the first aspect.

In a process embodiment, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, and the circuit is used as an input circuit and an output circuit at different moments. Specific embodiments of the processor and the various circuits are not limited in embodiments of this application.

According to a fifth aspect, a processing apparatus is provided, including a processor and a memory. The processor is configured to read instructions stored in the memory, and may receive a signal through a receiver, and transmit a signal through a transmitter, to perform the method according to any one of the first aspect or the embodiments of the first aspect.

Optionally, there are one or more processors, and there are one or more memories.

Optionally, the memory may be integrated with the processor, or the memory and the processor are separately configured.

In a process embodiment, the memory may be a non-transitory memory, such as a read-only memory (ROM). The memory and the processor may be integrated into one chip, or may be separately configured in different chips. A type of the memory and a manner in which the memory and the processor are configured are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the fifth aspect may be one or more chips. The processor in the processing apparatus may be implemented by hardware, or may be implemented by software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a sixth aspect, a computer program product is provided. The computer program product includes a computer program (also referred to as code or instructions). When the computer program is run, a computer is enabled to perform the method in any one of the first aspect or the embodiments of the first aspect.

According to a seventh aspect, a computer-readable storage medium is provided. The computer-readable storage medium stores a computer program (which may also be referred to as code or instructions). When the computer program is run on a computer, the method in any one of the first aspect and the embodiments of the first aspect is performed.

DESCRIPTION OF EMBODIMENTS

Figure 1:
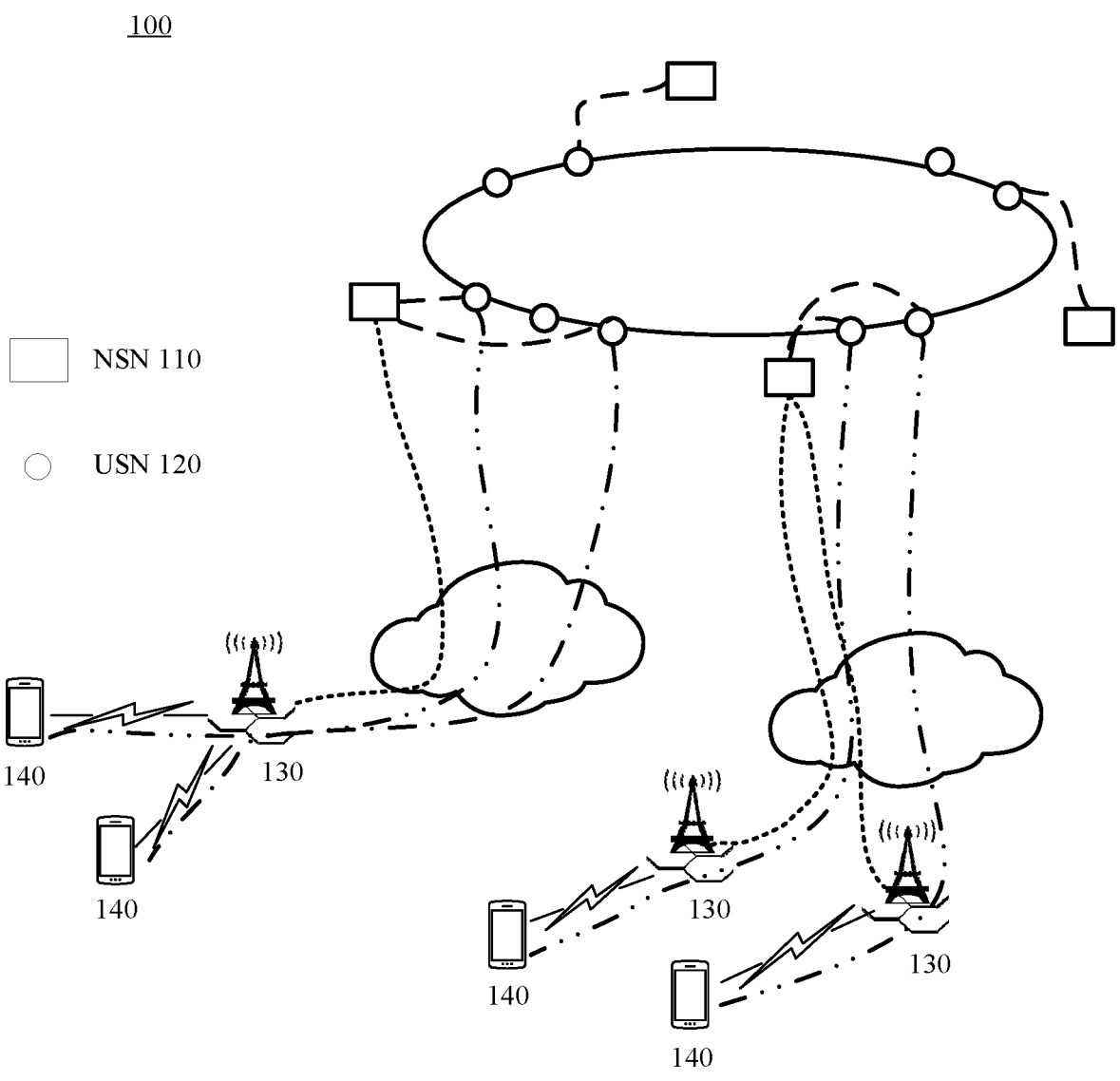
FIG. 1 is a schematic diagram of a communication system applicable to a method according to an embodiment of this application.

The following describes technical solutions of this application with reference to accompanying drawings.

The technical solutions in embodiments of this application may be applied to various communication systems, for example, a sixth generation (6th Generation, 6G) communication system or a future communication system.

A terminal device in embodiments of this application may be referred to as a user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus.

The terminal device may be a device that provides voice/data connectivity for a user, for example, a handheld device having a wireless connection function or an in-vehicle device. Currently, for example, some terminals may be a mobile phone, a tablet computer (pad), a computer with a wireless transceiver function (such as a notebook computer or a palmtop computer), a mobile internet device (MID), a virtual reality (VR) device, an augmented reality (AR) device, a wireless terminal in industrial control, a wireless terminal in self-driving, a wireless terminal in remote medical, and a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device, or another processing device connected to a wireless modem, an in-vehicle device, and a wearable device, a terminal device in a 5G network, a terminal device in a future evolved public land mobile network (PLMN), or the like.

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. IoT technologies can achieve massive connections, deep coverage, and terminal power saving by using, for example, a narrow band (NB) technology.

As existing communication networks are becoming more complex, network elements are extremely large and various. As a result, there are too many interfaces, protocols, and frequent signaling interaction, which brings high costs and increases a risk of being vulnerable to attacks.

Existing mobile communication systems are all network-centric, and users adapt to networks. That is, users can only select functions provided by networks. Especially, functions provided by a centralized core network are of large granularity, and cannot meet personalized requirements of users. However, users that choose personalized services are increasing. In addition, the internet of everything brings a sharp increase in terminal types. Functions of different terminals need to be customized based on requirements. For example, paging is not required for non-mobile terminals, and some terminals in the internet of things do not need voice functions.

In addition, an existing centralized core network element (for example, a mobile management function network element, a session management function network element, a user data management function network element, and a policy management function network element) entity is usually capable of processing a large quantity of users and is deployed in a centralized manner. Therefore, there may be a risk of a single-point failure and a distributed denial of service (DDoS) attack, which may cause huge property and reputation loss of a user.

Figure 3:
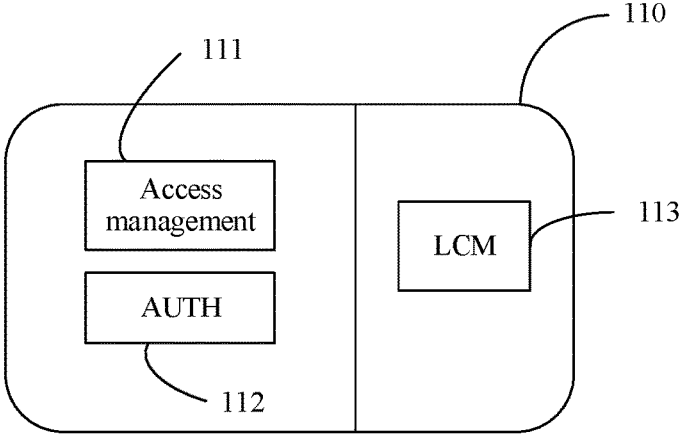
FIG. 3 is a schematic diagram of a structure of an NSN.

To resolve the foregoing problem, a user-centric network (UCN) architecture is proposed. As shown in FIG. 1, a communication system 100 may include a network service node (NSN) 110 and a user service node (USN) 120. It should be understood that FIG. 3 is merely an example, and shows that the communication system 100 includes four NSNs 110 and nine USNs 120. In actual deployment, the communication system 100 may include more NSNs 110 and/or more USNs 120.

The NSN 110 is an initial access point of a terminal device on a core network side, and is directly deployed and managed by a network operator. The NSN 110 may be independently deployed, or may be deployed on an edge cloud or an access network device 130. The NSN 110 may activate the USN 120, and may perform life cycle management on the USN 120. The NSN 110 may manage one or more USNs 120, and the NSN 110 may communicate with the USN 120 managed by the NSN 110 through an external interface. The NSN 110 serves one or more access network devices 130, and the NSN 110 may communicate with the access network device 130 served by the NSN 110 through a communication interface. A terminal device 140 may communicate with the NSN 110 through the access network device 130.

It should be understood that the NSN communicates with the USN through an external interface, and a standard interface and a standard communications protocol need to be defined for an interface between the NSN and the USN. The standard interface may be an existing standard interface, or may be a newly defined standard interface. The standard communications protocol may be an existing standard communications protocol, or may be a newly defined standard communications protocol.

That the NSN 110 is an initial access point of a terminal device on a core network side may be understood as follows: In a process in which the terminal device accesses the core network by using the access network device, the terminal device is first connected to the NSN 120, and then the terminal device may be connected to the USN 120 through the NSN 120.

That the NSN 110 activates the USN 120 may be understood as follows: In a process in which the terminal device 140 initially accesses a network, the NSN 110 activates, based on a request of the terminal device, a USN 120 serving the terminal device, and associates the terminal device 140 with the USN 120. For example, the step of activating the USN 120 by the NSN 110 may be described as follows:

The NSN receives a request message from the terminal device through the access network device served by the NSN, where the request message is used to request access, and the request message includes identifier information of the terminal device. The NSN obtains an identifier of the USN, where the identifier of the USN is associated with the identifier information of the terminal device. The NSN associates the USN with the terminal device.

That the identifier of the USN is associated with the identifier information of the terminal device may be understood as that there is a correspondence, a mapping, or the like between the identifier of the USN and the identifier information of the terminal device. In other words, when the identifier information of the terminal device is obtained, the identifier of the USN may be obtained based on the correspondence, the mapping, or the like between the identifier information of the terminal device and the identifier of the USN.

That the identifier of the USN is associated with the identifier information of the terminal device may also be understood as that the identifier of the USN may be obtained by processing the identifier information of the terminal device. For example, the identifier of the USN may be obtained by performing hash calculation on the identifier information of the terminal device.

The NSN 110 may also configure one or more of the following for the USN 120: storage resources, computing resources, network resources, a central processing unit (CPU), a storage database, and personalized parameters.

The storage resources may be resources required by the USN 120 to store computer instructions or the like. First information is described in detail below, and the details are not described herein. The computing resources may be resources needed in a process of executing computer instructions by the USN 120, for example, may be powerful graphics processing (GPU) computing resources. The network resources may be resources required for communication between the USN 120 and the NSN 110, the terminal device, or the like. The central processing unit may be configured to execute computer instructions and the like. The database may be configured to store the first information and the like. The database may alternatively be a distributed storage database.

The personalized parameters may be configured by the NSN based on types or a quantity of terminal devices served by the USN. For example, if the terminal device served by the USN is a non-mobile terminal device, the NSN may not configure a paging function in mobile management for the USN. For another example, if the terminal device served by the USN is an internet of things terminal device of a machine type, the NSN may not configure a voice function in session management for the USN. For another example, for different quantities of terminal devices served by the USN, the NSN may configure different storage resources, computing resources, network resources, and the like for the USN. For another example, for a customized service enabled through negotiation of the terminal device served by the USN with an operator, the NSN may configure powerful GPU computing resources, an artificial intelligence (AI) capability, and the like for the USN.

The USN 120 is associated with the terminal device 140, belongs to the terminal device 140 exclusively, and provides all network services for the terminal device 140, for example, mobile management (MM), session management (SM), policy management (PM), and data forwarding. The USN 120 may communicate with the terminal device 140 associated with the USN 120 through the access network device 130. In other words, the USN 120 may communicate with the access network device 130 through a communication interface.

That the USN 120 is a first USN is used as an example. A step in which the USN 120 provides a data forwarding service for the terminal device may be described as follows:

The first USN receives data from the first terminal device, where the data includes identifier information of the second terminal device. The first USN obtains an identifier of the second USN, where the identifier of the second USN is associated with the identifier information of the second terminal device. The first USN sends the data to the second USN, where the data is sent to the second terminal device through the second USN.

Figure 2:
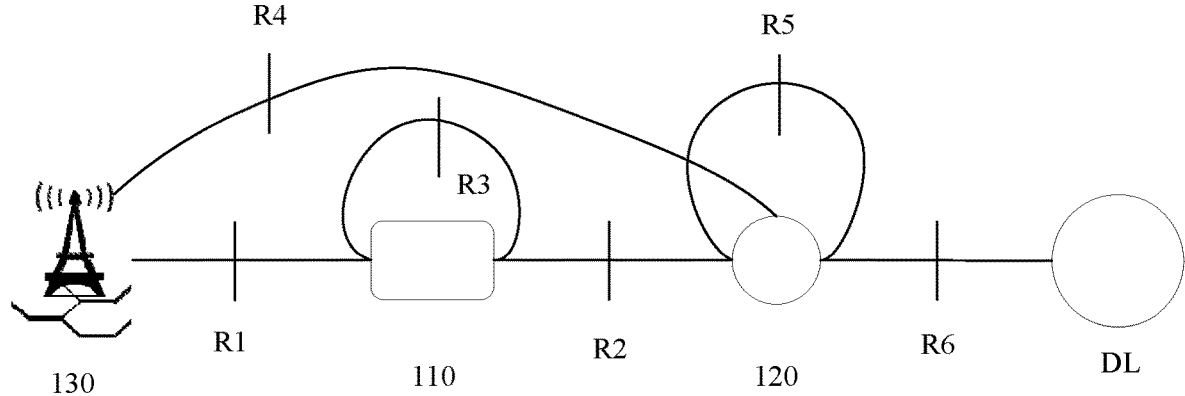
FIG. 2 is a schematic diagram of communication interfaces between an NSN, a USN, and an access network device.

FIG. 2 shows communication interfaces between the NSN 110, the USN 120, and the access network device 130. R1 is a communication interface between the NSN 110 and the access network device 130; R2 is a communication interface between the NSN 110 and the corresponding USN 120; R3 is a communication interface between the NSN 110 and another NSN 110; R4 is a communication interface between the access network device 130 and the USN 120, where the access network device 130 and the USN 120 implement forwarding of all control-plane signaling and data through the R4 interface; and R5 is a communication interface between the USN 120 and another USN 120. It should be understood that, in this embodiment of this application, that the communication interfaces between the NSN 110, the USN 120, and the access network device 130 are named R1 to R5 is used as only an example, and should not constitute any limitation on this embodiment of this application.

In an embodiment, the USN 120 may be associated with one terminal device or a group of terminal devices, and exclusively belongs to the terminal device or the group of terminal devices. All terminal devices 140 in the group of terminal devices may be terminal devices in a same region, or may be terminal devices in a same enterprise, or may be terminal devices having a same network requirement, or the like. This is not limited in this embodiment of this application.

In an embodiment, the USN 120 may form a distributed hash table (distributed hash table, DHT), and the USN 120 may be considered as a node in the DHT. It should be understood that, in this case, the NSN 110 will operate outside the DHT, and may help the USN 120 configure the DHT. To be specific, the NSN 110 is an initial contact point for the USN 120 to join the DHT.

Figure 6:
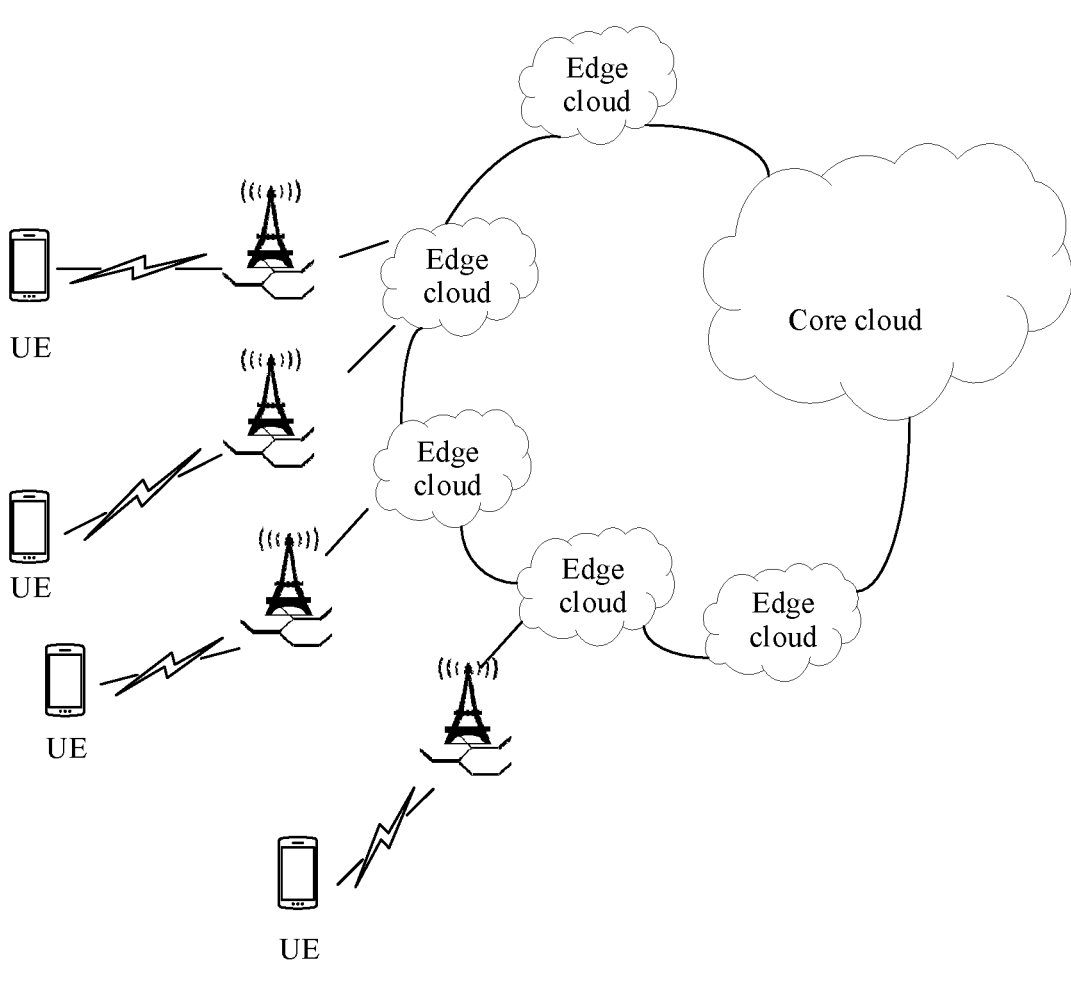
FIG. 6 is a schematic diagram in which an edge cloud is widely deployed.

In an embodiment, with reference to the following application scenario shown in FIG. 6, the USN 120 may be deployed in an edge cloud in a distributed manner.

Figure 4:
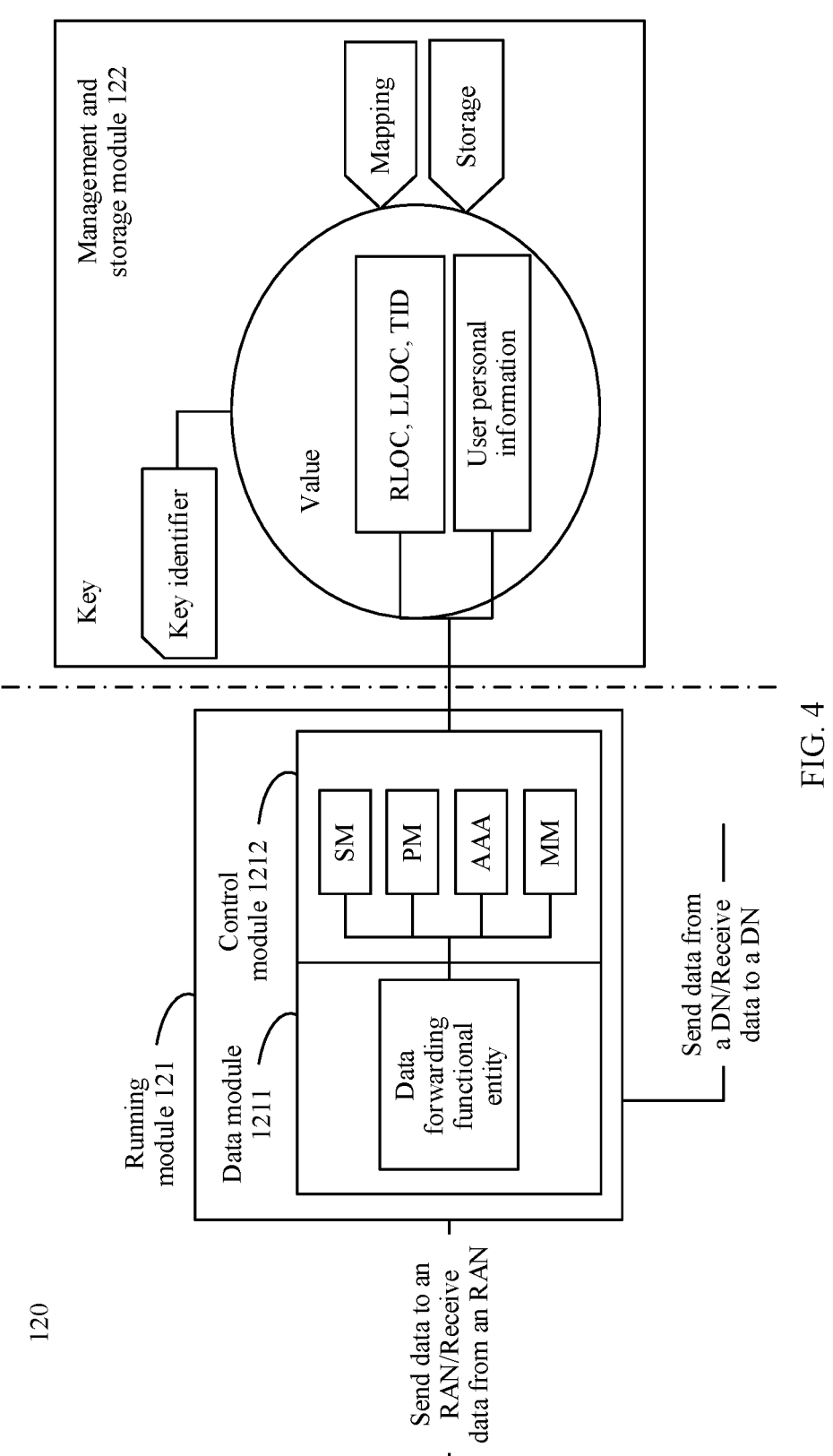
FIG. 4 is a schematic diagram of a structure of a USN.

The following describes structures of the NSN 110 and the USN 120 with reference to FIG. 3 and FIG. 4.

The NSN 110 is the initial access point of the terminal device on the core network side, and the NSN 110 has some lightweight core network functions, for example, authentication and default connection establishment. The NSN 110 may include an access management functional entity and/or an authentication (AUTH) functional entity. For example, the NSN 110 shown in FIG. 3 includes an access management functional entity 111 and an authentication functional entity 112.

The access management functional entity is used to connect to an access network device, and perform registration, reachability management, access authorization, and the like on the terminal device. If the terminal device does not need registration, reachability management, access authorization, or the like, the NSN 110 may not include the access management functional entity. The access management functional entity may be software, hardware, a combination of software and hardware, or the like. An entity that can implement an access management function may be equivalent to the access management functional entity in this embodiment of this application.

The AUTH functional entity is used to perform authentication on a user. If authentication does not need to be performed on a user, the NSN 110 may not include the AUTH functional entity. The AUTH functional entity may be software, hardware, a combination of software and hardware, or the like. An entity that can implement an authentication function may be equivalent to the AUTH functional entity in this embodiment of this application.

In an embodiment, the NSN 110 may further have a function of performing life cycle management on the USN 120. For example, as shown in FIG. 3, the NSN 110 may further include an LCM functional entity 113. The LCM functional entity 113 is configured to perform life cycle management on the USN 120, for example, activate the USN 120 or deactivate the USN 120. The LCM functional entity may be software, hardware, a combination of software and hardware, or the like. An entity that can implement a life cycle management function may be equivalent to the LCM functional entity in this embodiment of this application.

In an embodiment, the access management functional entity, the AUTH functional entity, or the LCM functional entity may be integrated, or may be configured separately.

It should be understood that, when the NSN 110 includes two or more functional entities, the two or more functional entities included in the NSN 110 may communicate with each other through an internal interface. For example, if two functional entities included in the NSN 110 are implemented by software, the two functional entities may communicate with each other through a simple internal function call. Compared with an external interface between the NSN 110 and the USN 120, a standard interface and communication protocol does not need to be defined for the internal interface.

The USN 120 may include the following functional entities: a data forwarding functional entity, a session management functional entity, and a user data storage functional entity. The functional entities included in the USN may communicate with each other through an internal interface. For example, if two functional entities included in the USN 120 are implemented by using software, the two functional entities may communicate with each other by using a simple internal function call. Compared with an external interface between the NSN 110 and the USN 120, a standard interface and communication protocol does not need to be defined for the internal interface.

The SM functional entity is used to establish a connection between the USN 120 and the terminal device. The SM functional entity may be software, hardware, a combination of software and hardware, or the like. An entity that can implement a session management function may be equivalent to the SM functional entity in this embodiment of this application.

The data forwarding functional entity is used to receive or send data, for example, receive data from a radio access network (RAN) device, or send data to a RAN device. The data forwarding functional entity may be software, hardware, a combination of software and hardware, or the like. An entity that can implement a data forwarding function may be equivalent to the data forwarding functional entity in this embodiment of this application.

The user data storage functional entity is used to store first information. The first information may include one or more of the following: information that requires privacy protection, identity information of the terminal device served by the USN 120, and user identity information. The information that requires privacy protection may include any one of the following: subscription data, personal information, and property account information of a user. The user identity information may include any one of the following: a name, a gender, and an ID card number. The identifier information of the terminal device may include any one of the following: an international mobile subscriber identity (IMSI), a subscription permanent identifier (SUPI), and a phone number. The user data storage functional entity may further store a mapping relationship between the user identity information and an address, and/or a mapping relationship between the user identity information and a user identity in an application. The user identity in the application may be an account name registered by the user in the application, and the address includes a routable address (routing locator, RLOC) and a local address (local locator, LLOC).

The user data storage functional entity may further provide a part or all of the stored first information for the third party according to an indication of the terminal device served by the USN 120. The third party may be another operator different from a home operator of the terminal device, or may be an application on the terminal device, or may be another terminal device. This is not limited in this embodiment of this application.

In an embodiment, the USN 120 may further include at least one of the following functional entities that communicate with each other through an internal interface: a PM functional entity, an authentication and authorization (authentication authorization accounting, AAA) functional entity, or an MM functional entity. For example, when the USN 120 further includes the PM functional entity, the PM functional entity may communicate with any one of the data forwarding functional entity, the session management functional entity, and the user data storage functional entity through the internal interface. Similarly, the AAA functional entity or the MM functional entity may communicate with any one of the data forwarding functional entity, the session management functional entity, and the user data storage functional entity through the internal interface. For another example, when the USN 120 further includes the PM functional entity and the AAA functional entity, the PM functional entity and the AAA functional entity may communicate with each other through the internal interface, and the PM functional entity and the AAA functional entity may further separately communicate with any one of the data forwarding functional entity, the session management functional entity, and the user data storage functional entity through the internal interface.

The PM functional entity is a unified policy framework used to guide a networking behavior. The PM functional entity may be software, hardware, a combination of software and hardware, or the like. An entity that can implement a policy management function may be equivalent to the PM functional entity in this embodiment of this application.

The AAA functional entity is used to perform authentication, authorization, accounting, and the like for a user. The AAA functional entity may be software, hardware, a combination of software and hardware, or the like. An entity that can implement authentication, authorization, and accounting functions may be equivalent to the AAA functional entity in this embodiment of this application.

The MM functional entity is used to perform mobile management, for example, lawful interception. The MINI functional entity may be software, hardware, a combination of software and hardware, or the like. An entity that can implement a mobile management function may be equivalent to the MINI functional entity in this embodiment of this application.

It should be understood that a plurality of functional entities included in the USN 120 may be separately configured, or may be integrated. This is not limited in this embodiment of this application.

FIG. 4 shows an example schematic diagram of a structure of the USN 120. As shown in FIG. 4, the USN 120 may send data to a radio access network (RAN) device, or receive data from a RAN device, or the USN 120 may receive data from a data network (DN) device, or send data to a DN device.

The USN 120 shown in FIG. 4 includes a running module 121. The running module 121 mainly includes a data forwarding functional entity, an SM functional entity, a PM functional entity, an AAA functional entity, and an MM functional entity. The data forwarding functional entity and another functional entity may be integrated, or may be configured separately. For example, the data forwarding functional entity may be configured independently from another functional entity, that is, the data package forwarding functional entity may be an independent module, for example, may be referred to as a data module 1211. The SM functional entity, the PM functional entity, the AAA functional entity, and the MM functional entity may be integrated, or may be separately configured. For example, the SM functional entity, the PM functional entity, the AAA functional entity, and the MM functional entity may be integrated, and are referred to as a control module 1212.

The USN 120 shown in FIG. 4 further includes a management and storage module 122. The management and storage module 122 may correspond to the user data storage functional entity described above. For example, as shown in FIG. 4, the management and storage module 122 may store user personal information, and may also store a mapping relationship between the user personal information and a temporary identifier (TID), and/or a mapping relationship between the user personal information, and an RLOC and an LLOC. The TID may correspond to the identity of the user in the application described above.

As described above, the USN 120 has the identifier corresponding to the USN 120, and the identifier information of the terminal device, the identifier of the USN 120, and information stored in the USN 120 may be stored in a key-value pair manner. As shown in FIG. 4, a key in FIG. 4 may be corresponding to the identifier information of the terminal device, a key identifier may be corresponding to an identifier of the USN 120, and a value may be corresponding to the information stored in the USN 120. When the identifier information of the terminal device (the key) is obtained, the identifier of the USN 120 (the key identifier) may be obtained based on the identifier information of the terminal device. Further, the information stored in the USN 120 may be indexed based on the identifier of the USN 120.

It should be understood that, in this embodiment of this application, FIG. 4 is merely used as an example to describe a structure of the USN 120, and should not constitute any limitation on this embodiment of this application. USNs 120 serving different terminal devices 140 may include different functional entities. For example, a USN 120 serving a non-mobile terminal device 140 may not include the MM functional entity. For another example, a USN 120 serving a terminal device 140 that does not require an authentication, authorization, and accounting function may not include the AAA functional entity.

It should be further understood that names of the modules included in the USN 120 in this embodiment of this application are merely examples, and should not constitute a limitation on this embodiment of this application. The modules included in the USN 120 may also be named with other names. For example, the management and storage module may be named as a user data storage functional entity, a user data storage module, a user data management functional entity, or the like.

Figure 5:
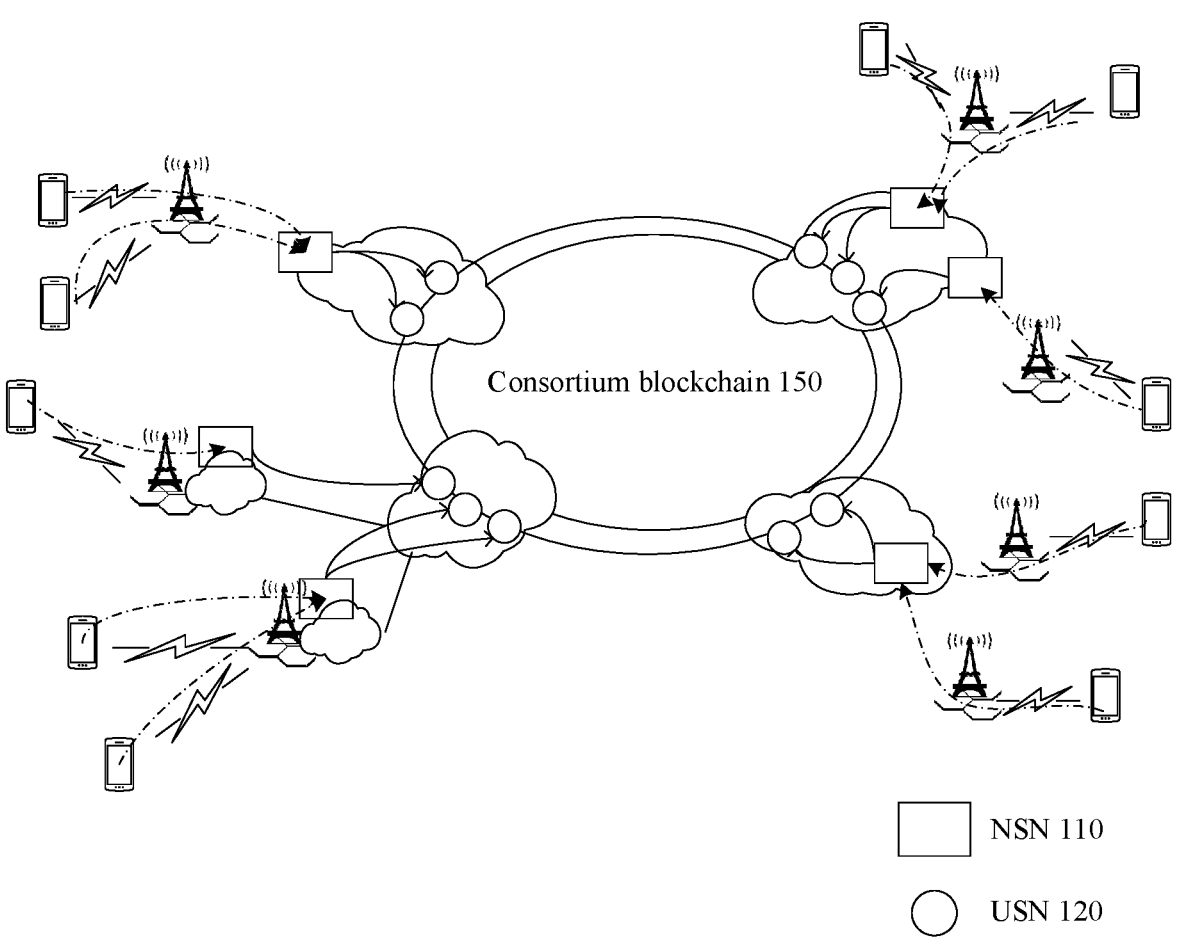
FIG. 5 is a schematic diagram of another communication system applicable to a method according to an embodiment of this application.

In an embodiment, as shown in FIG. 5, the communication system 100 provided in embodiments of this application may further include a consortium blockchain (consortium blockchain, CBC) 150.

The CBC 150 may include a plurality of operator networks, and is mainly used to store second information. The second information may include one or more of the following: a transaction record between a user and the operator, and a public key of the operator network. A storage address of the second information in the CBC 150 may be indicated by the first information stored in the USN 120. For example, after a user subscribes to an operator, the operator stores a transaction record in the CBC 150, and sends specific subscription content to the terminal device, and the terminal device stores the subscription content in the USN 120 serving the terminal device. In other words, the plurality of operators included in the CBC 150 can only see a transaction record between a user and an operator in the CBC 150, and there is no specific subscription content in the CBC 150.

The CBC 150 may further include digital asset management organizations of a plurality of banks, or may further include a plurality of identity management organizations, or may further include digital asset management organizations of a plurality of universities. In this case, the CBC 150 may further store a public key of the digital asset management organization of the bank, a public key of the identity management organization, or a public key of the digital asset management organization of the university, and the CBC 150 may further store a record of a service or a transaction provided by the bank, the identity management organization, or the university for a user.

In an embodiment, the CBC 150 may be replaced by a distributed ledger (distributed ledge technology, DL/DLT). A DLT is a database that is distributed on a plurality of nodes or computer devices. These nodes are geographically distributed in a plurality of networks, organizations, or countries. It can be learned that the CBC 150 is a form of the DLT. When the CBC 150 is replaced by the DLT, more users can view a subscription record between an operator and a user.

The CBC 150 or the DLT may communicate with the USN 120 through a communication interface. For example, FIG. 2 shows a communication interface R6 between the USN 120 and the DL. It should be understood that in this embodiment of this application, that the communication interface between the USN 120 and the DL is named R6 is merely used as an example, and should not be construed as any limitation on this embodiment of this application.

In a UCN network architecture, to quickly search for USNs of different UEs, an embodiment of this application proposes a solution of introducing a distributed hash table (DHT) into the UCN network architecture, that is, USNs of different UEs form nodes in the DHT. A conventional DHT randomly allocates a node identifier of each node, without considering a location relationship of nodes. As a result, a topology structure of an underlay physical network is inconsistent with a topology structure of an overlay network overlaid on the underlay network, and an end-to-end latency of the overlay network is high. This application proposes that geographical location sensing information is introduced into a DHT node identifier, to optimize routing, so as to reduce an end-to-end latency of the overlay network.

Embodiments of this application provide a node identifier based on geographical location information sensing, so that it can be ensured that a node that is identified nearby in space is also short-distance in a physical network, and a centralized landmark server does not need to be introduced. Based on the node identifier based on geographical location information sensing provided in embodiments of this application, an embodiment of this application further provides an identification method.

The following describes in detail embodiments provided in the embodiments of this application with reference to the accompanying drawings.

The UCN network architecture provided in embodiments of this application may be implemented based on a scenario in which an edge cloud is widely deployed. The edge cloud is first described with reference to FIG. 6. As shown in FIG. 6, an edge cloud and a core cloud are collaborative and complementary. The edge cloud is closer to a user, and can better support an application that has a high requirement on a latency, data privacy, and the like, and is suitable for distributed deployment of a networking function. A UE may access the edge cloud through an access network device.

The edge cloud is a type of a public cloud. Based on widely covering small sites, the edge cloud is usually a content delivery network (CDN), a point of presence (POP), and mobile edge computing (MEC). Each node provides a public cloud service in a small cluster form.

Figure 7:
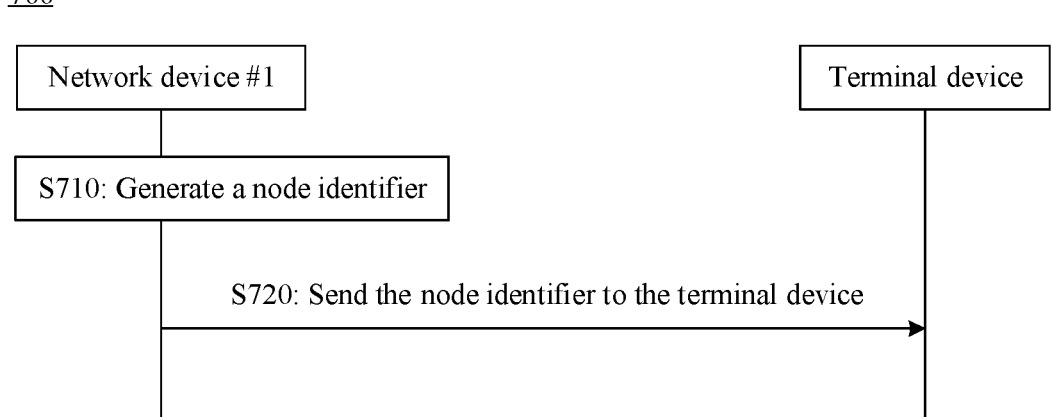
FIG. 7 is a schematic flowchart of a method according to an embodiment of this application.

FIG. 7 is a schematic interaction diagram of a method for accessing a network by a terminal device according to an embodiment of this application. The method shown in FIG. 7 may be applied to the UCN network architecture shown in FIG. 1 or FIG. 5, and certainly, may alternatively be applied to another network architecture. As shown in FIG. 7, the method 700 may include S710 and S720. The steps are described below in detail.

S710: A network device #1 (an example of a first network device) generates a node identifier.

Based on the UCN network architecture provided in embodiments of this application, the network device #1 may be an NSN, and a node may be a USN. The network device #1 may alternatively be another device having a wireless transceiver function, for example, may be a NodeB (Node, NB), an evolved NodeB (evolved NodeB, eNB), a base station controller (basic station controller, BSC), or a base transceiver station (BTS), or may be a gNB in an NR system in 5G.

In an embodiment, the node may be a node in a DHT.

Figure 8:
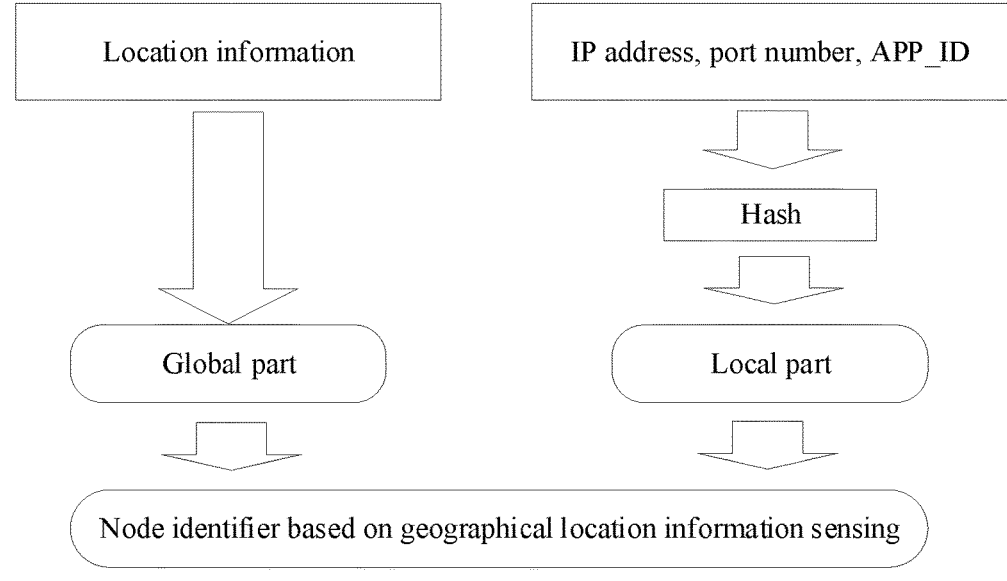
FIG. 8 is a schematic structural diagram of a node identifier according to an embodiment of this application.

FIG. 8 is a schematic structural diagram of an identifier of a node according to an embodiment of this application. As shown in FIG. 8, the node identifier may include a global part and a local part.

The global part of the node identifier is determined based on geographical location information of a region covered by a network device #2 (an example of a second network device) in which the node is located. The geographical location information of the region covered by the network device #2 is not limited in this embodiment of this application.

In an embodiment, the geographical location information of the region covered by the network device #2 includes geographical location information of the network device #2. It should be understood that one network device #2 may be uniquely identified based on the geographical location information of the network device #2. It should be further understood that the network device #1 and the network device #2 may be a same network device, or the network device #1 may be a network device managed by the network device #2.

The network device #2 may be any device having a wireless transceiver function, for example, may be an eNB, a BSC, or a BTS, or may be, for example, a gNB in an NR system in 5G.

The network device #2 may alternatively be a site in an edge cloud, for example, may be a CDN, a POP, or an MEC.

Based on the UCN network architecture provided in embodiments of this application, the network device #2 may alternatively be an NSN.

In an embodiment, there are a plurality of network devices #2 in the region covered by the network device #2. For example, the network device #2 is a gNB #1, and a gNB #2, a gNB #3, and the like may further exist in a region covered by the gNB #1.

In an embodiment, the region covered by the network device #2 includes only one network device #2. For example, in a process of deploying the edge cloud, one site is usually deployed in one geographical region. For example, the deployed site may be an MEC. If the network device #2 is an edge cloud site #1 (for example, a CDN, a POP, or an MEC), there is no other edge cloud site in a region covered by the edge cloud site #1 except the edge cloud site #1.

It should be understood that, in this embodiment of this application, an example in which the network device #2 is the gNB #1 or the edge cloud site #1 is merely used for description, and should not be construed as any limitation on this embodiment of this application. Certainly, when the network device #2 is the gNB #1, there may be no other gNB in the region covered by the gNB #1 except the gNB #1. When the network device #2 is the edge cloud site #1, there may be another edge cloud site in the region covered by the edge cloud site #1 except the edge cloud site #1.

The geographical location information of the network device #2 is not limited in this embodiment of this application.

In an example, the geographical location information of the network device #2 may include one or more of the following: a mobile country code (MCC), a mobile network code (MNC), an identifier of a geographical region in which the network device #2 is located, an identifier of a network device set to which the network device #2 belongs, and a serial number of the network device #2 in the network device set.

The MCC is a three-digit code that uniquely identifies a country to which a mobile subscriber belongs. The MNC is a code of an operator network in a country, includes two to three digits, and identifies a mobile network to which a mobile subscriber belongs.

For example, if there is no network device deployed by an operator other than an operator to which the network device #2 belongs in the geographical region in which the network device #2 is located, the geographical location information of the network device #2 may not include an MCC and an MNC. For another example, if there is only one network device #2 in the geographical region in which the network device #2 is located, the geographical location information of the network device #2 may not include an identifier of a network device set to which the network device #2 belongs or a serial number of the network device #2 in the network device set. For still another example, if there is only one network device set in the geographical region in which the network device #2 is located, the geographical location information of the network device #2 may not include an identifier of the network device set to which the network device #2 belongs.

Figure 9:
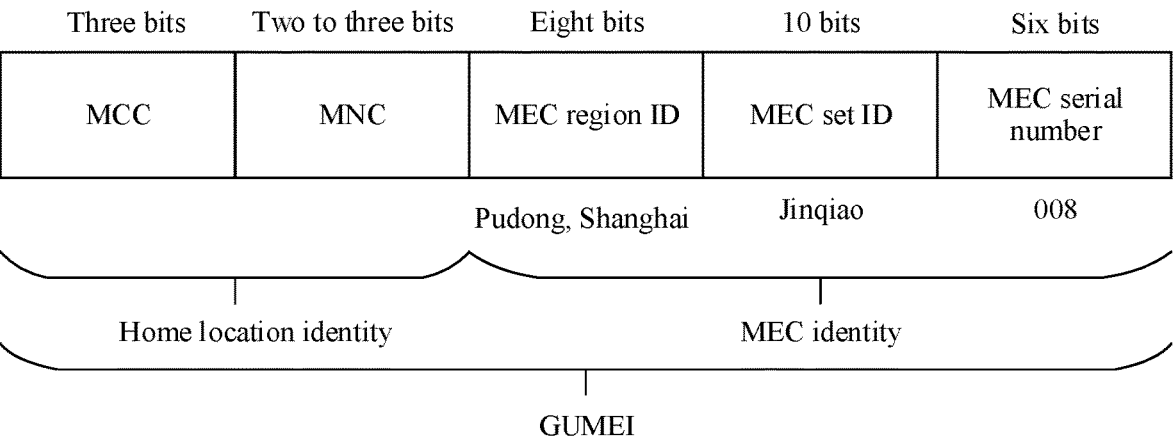
FIG. 9 is a schematic structural diagram of a globally unique MEC identity according to an embodiment of this application.

FIG. 9 uses an example in which the network device #2 is a device in MEC, and shows a coding scheme for geographical location information of the MEC.

As shown in FIG. 9, because geographical location information of an MEC may uniquely identify one MEC, the geographical location information of the MEC may also be referred to as a globally unique MEC identity (GUMEI). The GUMEI may include a home location identifier and an MEC identity (ID). The home location identifier may include an MCC and an MNC. The MEC ID may include an MEC region ID, an MEC set ID, and an MEC serial number (pointer). The MEC region ID is an identifier of a geographical region in which the MEC is located. The geographical region may be, for example, a specific district-level administrative unit, for example, Pudong, Shanghai. The MEC set ID is an identifier of a set including MECs in a lower-level region in the geographical region in which the MEC is located. The lower-level region in the geographical region in which the MEC is located may be a township-level administrative unit, for example, Jinqiao of Pudong, Shanghai. The MEC serial number is a serial number that is of the MEC in a set to which the MEC belongs, for example, 008.

Figure 10:
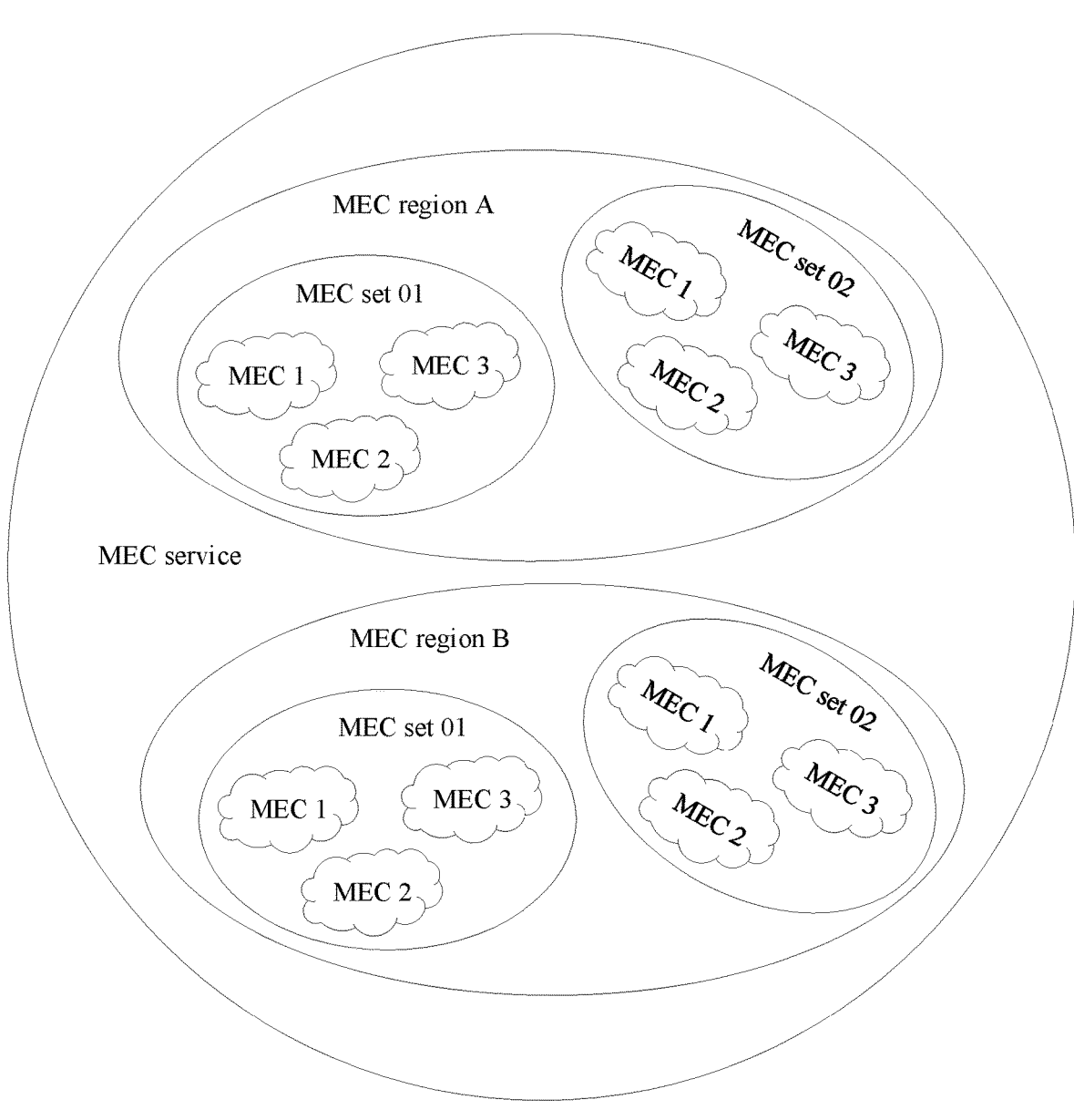
FIG. 10 is a schematic structural diagram of an MEC region.

FIG. 10 is a schematic structural diagram of an MEC region. As shown in FIG. 10, the MEC region includes one or more MEC sets, and the MEC set may include one or more MECs. For example, an MEC region A includes an MEC set 01 and an MEC set 02, and the MEC set 01 includes an MEC 1 to an MEC 3. It should be understood that FIG. 10 is merely an example, and shows that an MEC service includes two MEC regions, and an MEC set may alternatively include more MEC regions. FIG. 10 is merely an example, and shows that an MEC region includes two MEC sets, and an MEC region may alternatively include more or fewer MEC sets. FIG. 10 is merely an example, and shows that an MEC set includes two MECs, and an MEC set may alternatively include more or fewer MECs.

In another example, the geographical location information of the network device #2 may be a longitude and latitude of the network device #2.

In another embodiment, the geographical location information of the region covered by the network device #2 is determined based on geographical location information of a plurality of access network devices in the region.

In an embodiment, to avoid a change in geographical location information of the network device #2 that is determined based on geographical location information of a plurality of access network devices due to capacity expansion or reduction of access network devices in the region covered by the network device #2, the geographical location information of the region may be determined based on geographical location information of N access network devices that meet a preset condition in the region covered by the network device #2, and the preset condition is that the access network device always exists within a predefined time, where N is a positive integer. The predefined time may be in a unit of year, for example, one year, three years, or five years. For example, the predefined time may be a period of updating a communication system, for example, a period of updating from a third generation (3rd Generation, 3G) communication system to a fourth generation (4th Generation, 4G) communication system, or a period of updating from a 4G communication system to a fifth generation (5th Generation) communication system. It may be understood that in a process of updating a communication system, geographical location information of a main access device in the region covered by the network device #2 remains unchanged. In other words, in the process of updating a communication system, the main access network device is updated at an original address. Certainly, the predefined time may alternatively be another time.

In an embodiment, the geographical location information of the region covered by the network device #2 may be geographical coordinates (that is, a longitude and latitude). The geographical coordinates may be an average value of geographical coordinates of the N access network devices that meet the preset condition, or the geographical coordinates may be a sum of geographical coordinates of the N access network devices that meet the preset condition, or the geographical coordinates may be a variance of geographical coordinates of the N access network devices that meet the preset condition, or the like.

In an embodiment, the geographical location information of the region covered by the network device #2 may be spatial geographical coordinates, and the spatial geographical coordinates may be an average value of spatial geographical coordinates of the N access devices that meet the preset condition. As shown in Formula (1), $L_{network\ device\ #2}$ represents spatial geographical location coordinates of the region covered by the network device #2, and $L_{NBi}$ represents spatial geographical coordinates of an $i^{th}$ access device.

$$L_{network\ device\ #2} = \frac{1}{N}\sum_{k=0}^{N-1} L_{NBi} L_{NBi} = \begin{pmatrix} Xi \\ Yi \\ Zi \end{pmatrix} \tag{1}$$

$Xi$, $Yi$, and $Zi$ respectively represent coordinates of the $i^{th}$ access network device in a spatial geographical coordinate system. The spatial geographical coordinate system may be a world geodetic system (WGS)-84 geocentric coordinate system, or may be obtained based on a Beijing coordinate system 1954 or a Xi'an coordinate system 1980. For example, for more descriptions of spatial geographical coordinates, refer to a conventional technology. Details are not described herein in this embodiment of this application.

The local part is determined based on identity information of a terminal device associated with the node. The identity information of the terminal device may include at least one of the following: an IP address, a port number, an APP ID, a media access control (MAC) address, an IMSI, an SUFI, a phone number, and the like of the terminal device. This is not limited in this embodiment of this application.

A manner of determining the local part based on the identity information of the terminal device associated with the node may be as follows: performing hash processing on the identity information of the terminal device, to obtain the local part of the node identifier. For example, hash processing may be performed on the IMSI of the terminal device to obtain the local part. For another example, hash processing may be performed on the IP address of the terminal device to obtain the local part.

The following describes a manner of generating the node identifier by the network device #1 by using an example in which the node identifier is the identifier of the USN.

In an embodiment, after the terminal device subscribes to an operator, the network device #1 belonging to the operator allocates a nearby USN (the USN may be referred to as a home USN of the terminal device) to the terminal device, and generates a home USN node identifier based on the geographical location information of the region covered by the network device #2 in which the home USN is located and the identity information of the terminal device.

In another embodiment, if the terminal device moves from a home location to a visited location, after the terminal device accesses the network device #1 in the visited location, the network device #1 in the visited location allocates a nearby USN (the USN may be referred to as a visited USN of the terminal device) to the terminal device, and generates a visited USN node identifier based on the geographical location information of the region covered by the network device #2 in which the visited USN is located and the identity information of the terminal device, a global part of the visited USN node identifier may further identify the network device #2 accessed by the terminal device.

S720: The network device #1 sends the node identifier to the terminal device. Correspondingly, in S720, the terminal device receives the node identifier from the network device #1.

The node identifier may uniquely identify the node in a process in which the terminal device communicates with the node.

In an embodiment, when the node is the USN, the node identifier may be used in a process of identification between the terminal device and the USN. The following describes the process of identification between the USN and the terminal device with reference to another embodiment. The process of identification between the USN and the terminal device is not described in detail herein.

In this embodiment of this application, the global part of the node identifier is determined based on the geographical location information of the region covered by the network device #2 in which the node is located, so that the geographical location information can be introduced into the node identifier, and a node that is nearby in an overlay network can also be short-distance in a physical network, thereby optimizing routing and reducing an end-to-end latency. In addition, compared with the conventional technology, in the solution for determining a global part of a node identifier provided in this embodiment of this application, a centralized landmark server does not need to be introduced, and therefore a risk of a single-point failure and a DDoS attack can be avoided.

In addition, based on the UCN network architecture provided in embodiments of this application, when the node is the USN and the node identifier is the identifier of the USN node, the node identifier provided in this embodiment of this application may be used in the process of identification between the terminal device and the USN, to provide technical support for session establishment, mobile management, and the like, and may identify the network device #2 accessed by the terminal device.

Figure 11:
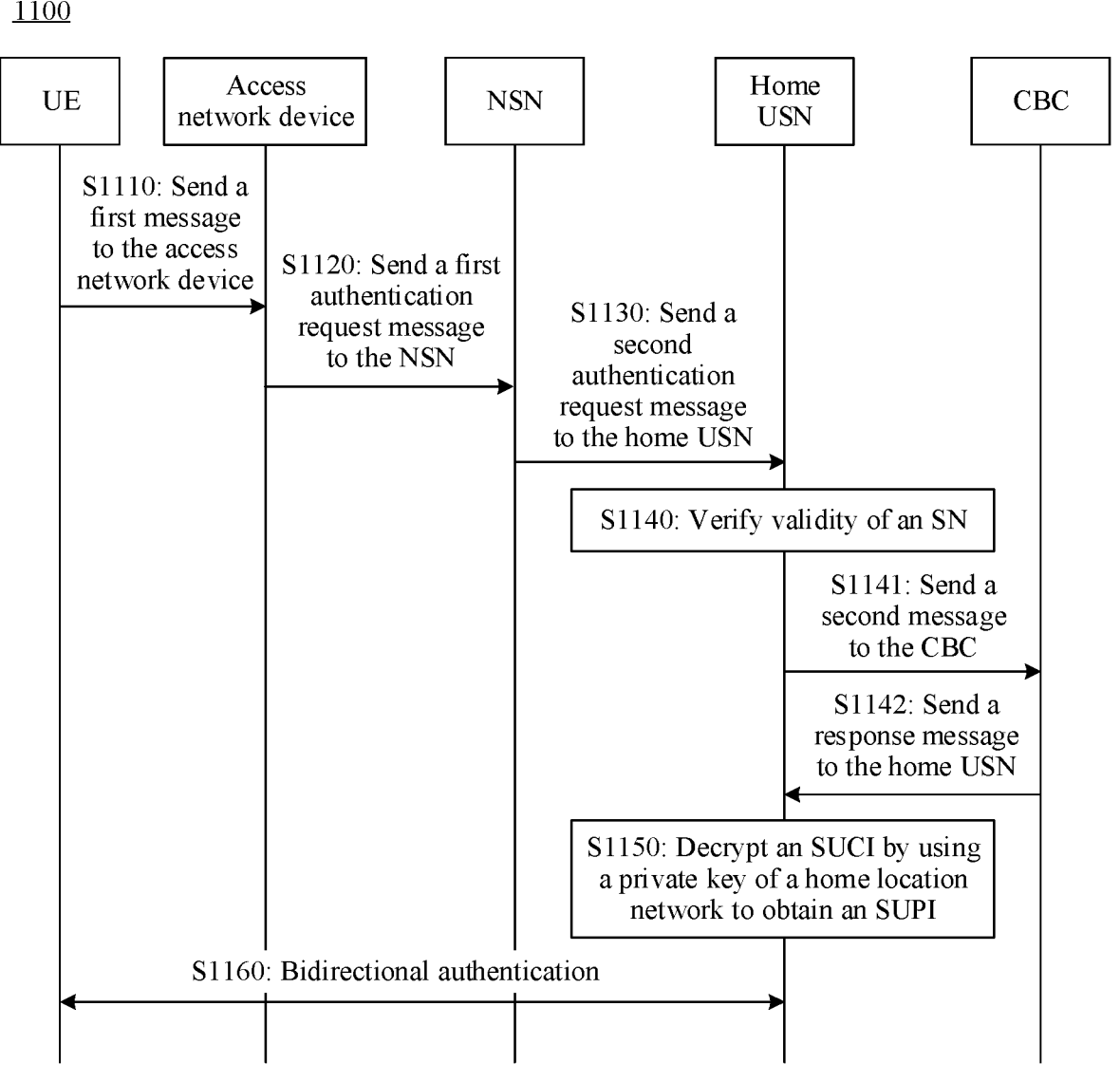
FIG. 11 is a schematic flowchart of an initial identification method according to an embodiment of this application.
Figure 12:
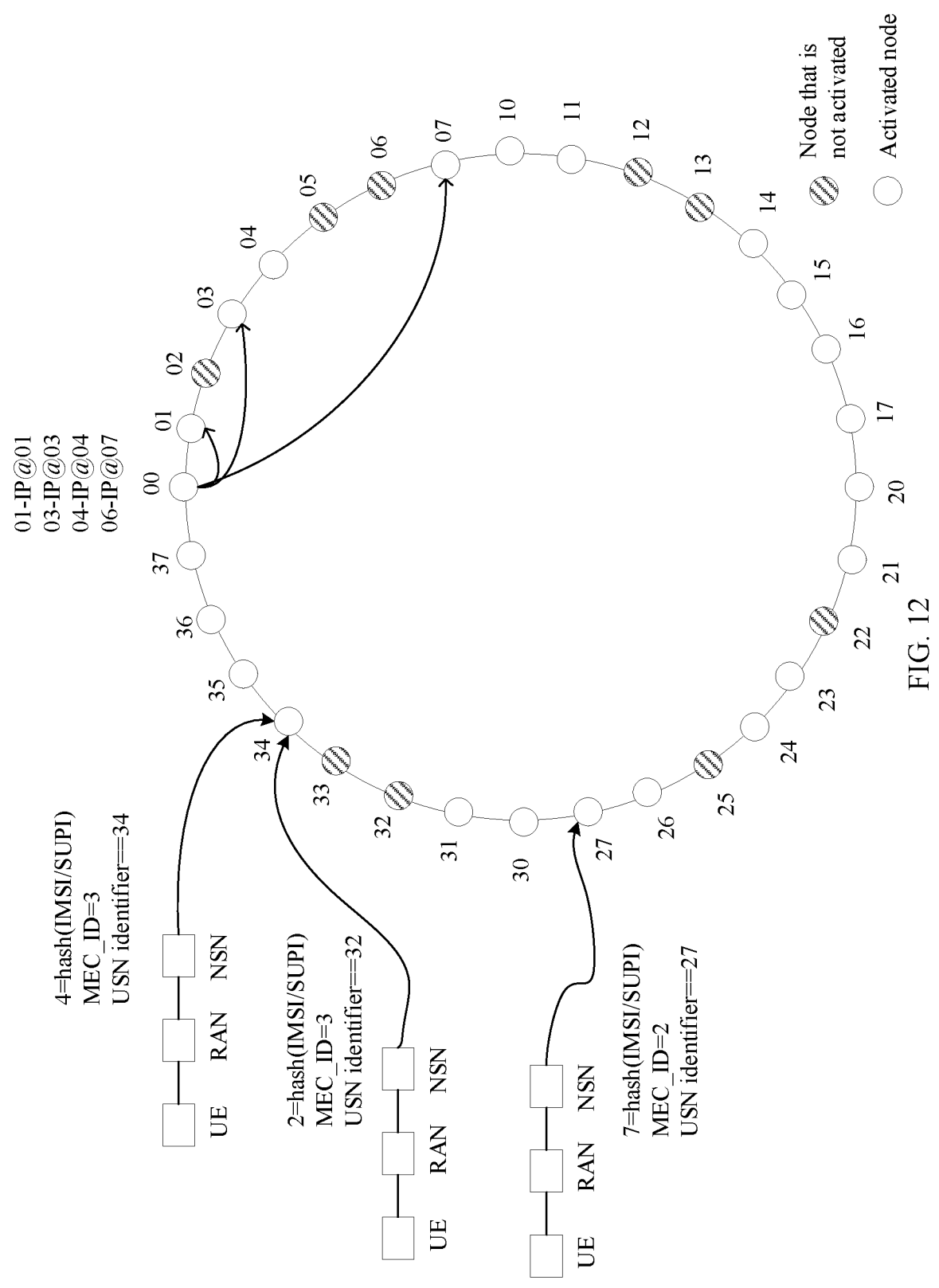
FIG. 12 is a schematic diagram of a USN node identifier according to an embodiment of this application.
Figure 13:
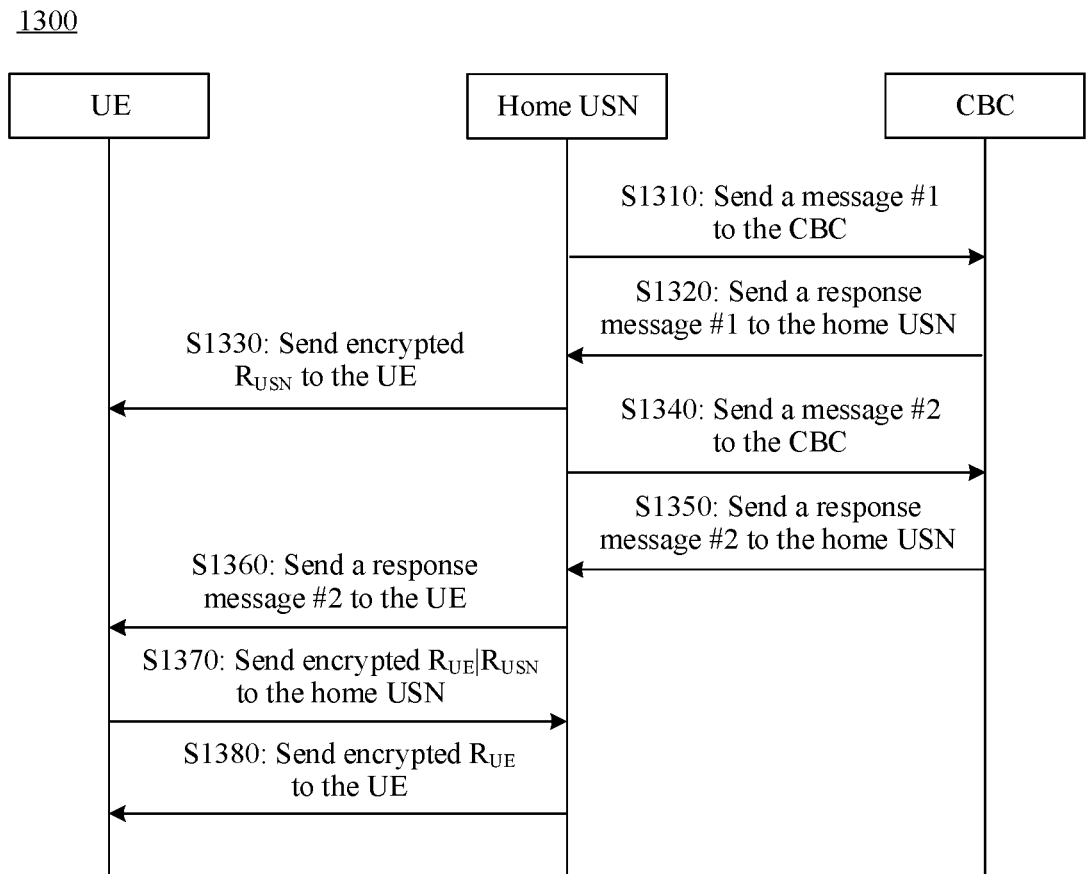
FIG. 13 is a schematic flowchart of a bidirectional identification method according to an embodiment of this application.

The following describes, with reference to FIG. 11 to FIG. 13, a method for performing identification by a terminal device and a USN based on a node identifier provided in embodiments of this application.

It should be noted that a scenario in which identification needs to be performed between the terminal device and the USN may be a scenario in which a user powers on the terminal device for the first time, or may be a scenario in which bidirectional identification needs to be performed again when the user powers off the terminal device for a long time and then powers on the terminal device.

FIG. 11 is a schematic flowchart of an initial identification method according to an embodiment of this application. The method 1100 may be applied to the communication system shown in FIG. 1 or FIG. 5. As shown in FIG. 11, the method 1100 may include steps S1110 to S1160. The following describes each step in detail.

It should be noted that an example in which a network device #2 is a device in MEC and a global part of a node identifier is an MEC_ID is used below for description.

S1110: A UE sends a first message to an access network device. Correspondingly, in S1110, the access network device receives the first message from the UE.

The first message includes a subscription concealed identifier (SUCI) of the UE, and the SUCI of the UE is obtained by the UE by encrypting non-routing information in an SUPI of the UE by using a public key of a home network (HN). The first message may further include an identity of a home USN transmitted in plaintext, and the identity of the home USN is used to address the home USN. In the following, the public key of the home network is denoted as $K^P_{HN}$, and the identity of the home USN is denoted as $USN^{ID}_{home}$.

$USN^{ID}_{home}$ is generated for the terminal device by the network device #1 deployed by an operator in a process in which the UE subscribes to the operator. For example, as shown in FIG. 12, $USN^{ID}_{home}$ includes an MEC_ID of a high byte bit and a hash (IMSI/SUPI) of a low byte bit, and the low byte bit is obtained by performing a hash operation on an IMSI or the SUPI of the UE. For example, if the MEC_ID is 2 and the hash (IMSI/SUPI) is 7, $USN^{ID}_{home}$=27 may be obtained.

It should be understood that the MEC_ID in the $USN^{ID}_{home}$ is an MEC_ID of an MEC in a subscription location existing when the UE subscribes to the operator. In a process in which the UE subscribes to the operator, the operator allocates a nearby home USN to the UE. Therefore, the MEC at the subscription location is an MEC (which may be referred to as a home MEC) to which the home USN belongs. In other words, a global part of $USN^{ID}_{home}$ is an MEC_ID of the MEC to which the home USN belongs. For a structure of the MEC_ID, refer to the description in S710. For brevity, details are not described in this embodiment of this application.

It should be further understood that FIG. 12 is merely an example. That the MEC_ID is two bits (bit) and the hash (IMSI/SUPI) is three bits is used as an example. However, in an actual situation, as described above, an MEC_ID is 29 to 30 bits, and for an IMSI/SUPI, a quantity of bits obtained after hashing are far greater than three bits.

S1120: The access network device sends a first identification request message to an NSN. Correspondingly, in S1120, the NSN receives the first identification request message from the access network device.

The access network device receives the first message from the UE, and may determine the MEC_ID based on $USN^{ID}_{home}$ included in the first message, and may further address the home MEC based on the MEC_ID. Further, the access network device may send the first identification request message to the NSN deployed in the home MEC. It should be understood that one NSN is usually deployed in one MEC. Therefore, one NSN may also be uniquely addressed based on an MEC_ID.

The first identification request message sent by the access network device to the NSN may include the SUCI of the UE and $USN^{ID}_{home}$.

In an embodiment, the first identification request message may further include an identifier of a service network (service network, SN) to which the access network device belongs, and $USN^{ID}_{home}$ is $USN^{ID}_{home}$ signed by using a private key of the service network. In the following, the identifier of the SN is denoted as SNid, and the private key of the SN is denoted as $K^S_{SN}$.

S1130: The NSN sends a second identification request message to the home USN. Correspondingly, in S1130, the home USN receives the second identification request message from the NSN.

The NSN addresses the home USN based on $USN^{ID}_{home}$ in the first identification request message sent by the access network device, and sends the second identification request message to the home USN.

The second identification request message includes the SUCI of the UE.

In an embodiment, if the first identification request message includes SNid and $USN^{ID}_{home}$ signed by using $K^S_{SN}$, the second identification request message may include SNid and $USN^{ID}_{home}$ encrypted by using $K^S_{SN}$.

In an embodiment, if the second identification request message includes SNid and $USN^{ID}_{home}$ encrypted by using $K^S_{SN}$, the method 1100 may further include S1140.

S1140: The home USN verifies validity of the SN.

If the home USN decrypts, based on a public key of the service network, $USN^{ID}_{home}$ encrypted by using $K^S_{SN}$, and can obtain correct $USN^{ID}_{home}$, it is determined that the SN is valid; or if the home USN decrypts, based on a public key of the service network, $USN^{ID}_{home}$ encrypted by using $K^S_{SN}$, but cannot obtain correct $USN^{ID}_{home}$, it is determined that the SN is invalid. In the following, the public key of the service network is denoted as $K^P_{SN}$. If the home USN determines that the SN is valid, the method 1100 continues to be performed. If the home USN determines that the SN is invalid, the identification process ends.

In an embodiment, if the home USN does not store $K^P_{SN}$, the method 1100 may further include S1141 and S1142.

S1141: The home USN sends a second message to a CBC. Correspondingly, in S1141, the CBC receives the second message from the home USN.

The second message includes SNid, and the second message is used to request to obtain $K^P_{SN}$. The second message may be a request message, or may be a message for requesting to obtain an SN public key.

S1142: The CBC sends a response message to the home USN. Correspondingly, in S1142, the home USN receives the response message from the CBC.

The response message includes {SNid, $K^P_{SN}$}.

S1150: The home USN decrypts the SUCI by using a private key (denoted as $K^S_{HN}$) of the home location network to obtain the SUPI.

It should be understood that the home USN may store $K^S_{HN}$. After receiving the identification request message #2 from the NSN, the home USN may decrypt, based on $K^S_{HN}$, the SUCI included in the identification request message #2, to obtain the SUPI of the UE, so as to determine, based on the SUPI, a specific UE to be authenticated.

S1160: The home USN selects an identification manner, and performs bidirectional identification with the UE.

A manner in which the home USN and the UE perform the bidirectional identification may be a CBC-based bidirectional identification manner, or may be internet of everything (internet of things, IoT)-type identification, or the like. The home USN may select an identification manner based on subscription content of the UE, or select an identification manner based on a type of the UE. For example, if an identification manner selected by the UE during subscription is CBC-based bidirectional identification, the home USN may select the CBC-based bidirectional identification manner. For another example, if the type of the UE is an internet of things terminal, the home USN may select an IoT-type identification manner. For an IoT-type identification manner, refer to the conventional technology. A CBC-based bidirectional identification process is described below with reference to FIG. 13.

FIG. 13 is a schematic flowchart of a method in which a home USN and a UE perform bidirectional identification based on a CBC. As shown in FIG. 13, the method 1300 may include S1310 to S1380. The following describes the steps in detail.

S1310: The home USN sends a message #1 to the CBC. Correspondingly, in S1310, the CBC receives the message #1 from the home USN.

The message #1 includes an SUPI, and the message #1 is used to request to obtain a public key of the UE. The message #1 may be a request message, or may be a message for requesting to obtain a public key of the UE.

S1320: The CBC sends a response message #1 to the home USN. Correspondingly, in S1320, the home USN receives the response message #1 from the CBC.

The response message #1 includes $\{SUPI, K^P_{UE}\}$.

S1330: The home USN generates a random number (denoted as $R^U_{SN}$), encrypts $R^U_{SN}$ by using $K^P_{UE}$, and sends encrypted $R^U_{SN}$ to the UE. Correspondingly, after receiving $R^U_{SN}$ that is encrypted by using $K^P_{UE}$ and that is sent by the home USN, the UE decrypts encrypted $R^U_{SN}$ by using a private key (denoted as $K^S_{UE}$) of the UE to obtain $R^U_{SN}$.

S1340: The home USN sends a message #2 to the CBC. Correspondingly, in S1340, the CBC receives the message #2 from the home USN.

The message #2 includes $USN^{ID}_{home}$, and the message #2 is used to request to obtain a public key (denoted as $K^P_{USN}$) of the USN.

S1350: The CBC sends a response message #2 to the home USN. Correspondingly, in S1350, the home USN receives the response message #2 from the CBC.

The response message #2 includes $\{USN'home, K^P_{USN}\}$. It should be understood that $K^P_{USN}$ obtained by the home USN from the CBC is registered with the CBC by a home location network, and $K^P_{USN}$ is signed by $K^S_{HN}$.

S1360: The home USN sends a response message #2 to the UE. Correspondingly, in S1360, the UE receives the response message #2 from the home USN.

After receiving the response message #2, the UE confirms a signature of the home location network by using $K^P_{HN}$, to verify a transaction and obtain $K^P_{USN}$.

S1370: The UE generates a new random number (denoted as $R_{UE}$), combines the new random number and $R^U_{SN}$ to form a random number $R_{UE}|R_{USN}$, encrypts $R_{UE}|R_{USN}$ by using $K^P_{USN}$, and sends the encrypted random number to the home USN. For example, if $R_{UE}$ is 12 and $R^U_{SN}$ is 14, $R_{UE}|R_{USN}$ formed by combining $R_{UE}$ and $R^U_{SN}$ is 1214. For another example, if $R_{UE}$ is 0101 and $R^U_{SN}$ is 1111, $R_{UE}|R_{USN}$ formed by combining $R_{UE}$ and $R^U_{SN}$ is 01011111. Correspondingly, after the home USN receives encrypted $R_{UE}|R_{USN}$, if $R^U_{SN}$ obtained by decrypting encrypted $R_{UE}|R_{USN}$ by using $K^S_{USN}$ is equal to $R^U_{SN}$ previously generated by the home USN, the home USN completes verification on the UE.

S1380: The home USN encrypts $R_{UE}$ by using $K^P_{UE}$, and sends encrypted $R_{UE}$ to the UE. Correspondingly, after receiving encrypted $R_{UE}$, the UE decrypts encrypted $R_{UE}$ by using $K^S_{UE}$, and if $R_{UE}$ obtained through decryption is equal to $R_{UE}$ previously generated by the UE, the UE completes identification with the home USN.

Figure 14:
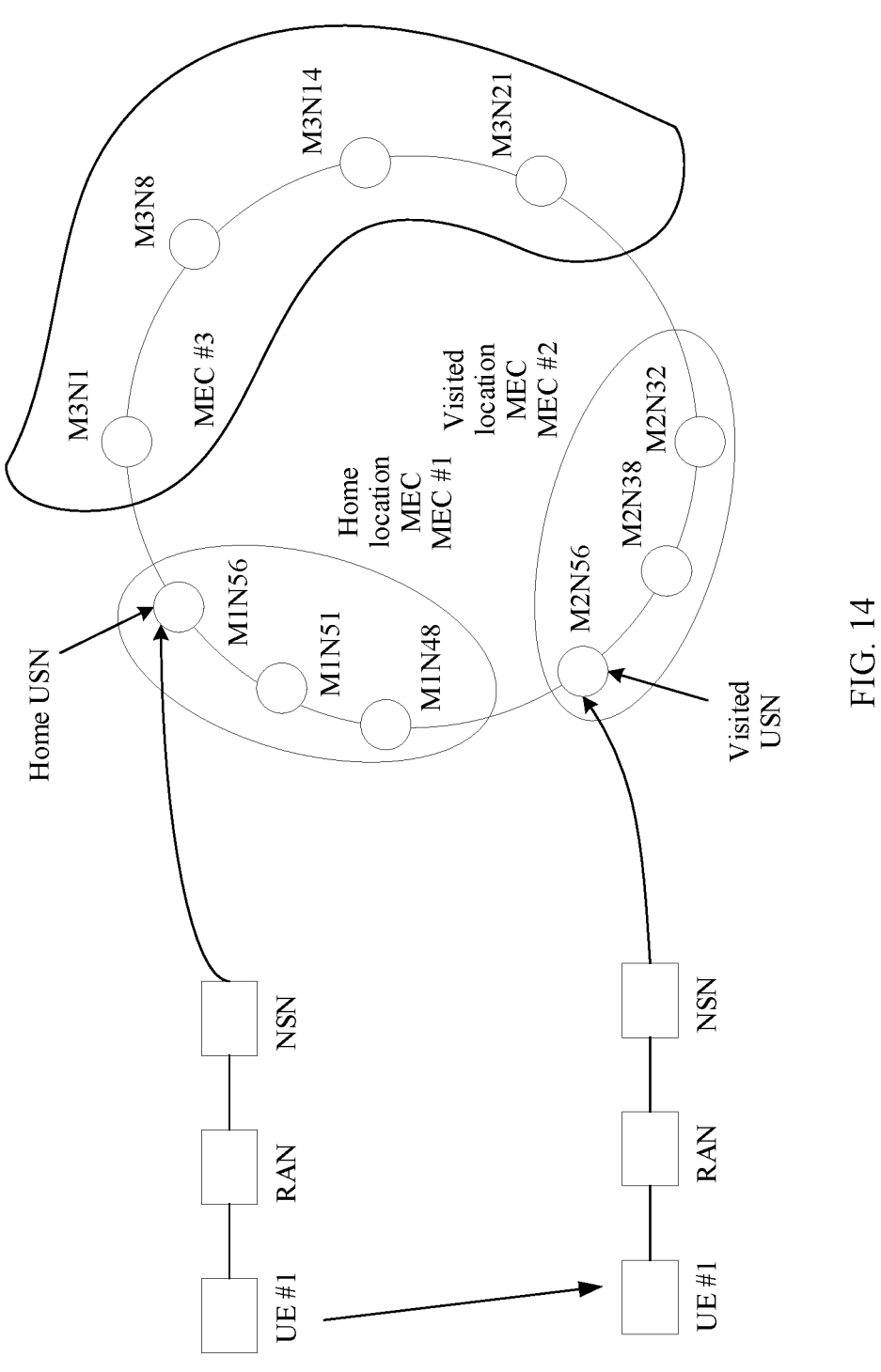
FIG. 14 is a schematic diagram of configuring a visited USN for a terminal device.

It should be noted that identification between the UE and the USN is definitely identification between the UE and the home USN, instead of identification between the UE and a visited USN. The visited USN is configured by an NSN in a visited location for the UE when the UE is in the visited location. For example, in FIG. 14, if UE #1 moves to a region in which an MEC #2 is located, an NSN in the MEC #2 configures a visited USN for the UE, and generates a node identifier of the visited USN based on the MEC in which the visited USN is located and identity information of the UE #1. In a subsequent communication process, an MEC_ID in the node identifier of the visited USN may be considered as a temporary identifier of the UE #1, which is similar to a globally unique temporary subscriber identifier (GUTI) in 5G. It should be understood that in FIG. 14, only an example in which three USNs are deployed in an MEC #1, three USNs are deployed in the MEC #2, and four USNs are deployed in an MEC #3 is used. In actual deployment, more MECs may be deployed, and more USNs may be deployed in each MEC.

After the bidirectional identification between the UE and the home USN is completed, the UE establishes a connection to the home USN, and implements a procedure such as user plane data forwarding through the home USN. Alternatively, after the bidirectional identification between the UE and the home USN is completed, if the UE is not in a home location, the UE establishes a connection to a visited USN, and implements a procedure such as user plane data forwarding through the visited USN.

When the UE implements a procedure such as user plane data forwarding by using a USN, the USN needs to maintain routing information of a node. Routing maintenance information of a USN node is shown in FIG. 12. Take a routing information table maintained by a USN node 00 as an example. If the USN node 00 obtains a storage address 01 after processing specific data, the data is stored on a USN node 01 because the USN node 01 is activated. Similarly, the USN node 00 stores data whose storage address is 03 on a node 03, and stores data whose storage address is 04 on a node 04. However, if the node 00 obtains a storage address 06 after processing specific data, and a USN node 06 is not activated, the USN node 00 stores the data to a next activated node in a clockwise direction. Therefore, for the data whose storage address is 06, the USN node 00 stores the data to a USN node 07. It should be understood that, to store data nearby, a node with a largest number in each MEC needs to be activated. In this way, data whose storage address is an address in the MEC is not stored on a node in a next MEC. For example, in FIG. 12, USN nodes whose global parts are all 0 are deployed in a same MEC, and the USN node 07 is a node with a largest number in the MEC. If the USN node 07 is not activated, data whose storage address is the USN node 07 needs to be stored in a USN node 10 in a clockwise direction. However, the USN node 10 and the USN node 07 are located in different MECs, and therefore nearby storage cannot be satisfied.

Embodiments described in this specification may be independent solutions, or may be combined based on internal logic. These solutions all fall within the protection scope of this application.

The communication method provided in embodiments of this application is described above in detail with reference to FIG. 7 to FIG. 14. The following describes in detail a communication apparatus provided in embodiments of this application with reference to FIG. 15 to FIG. 17.

Figure 15:
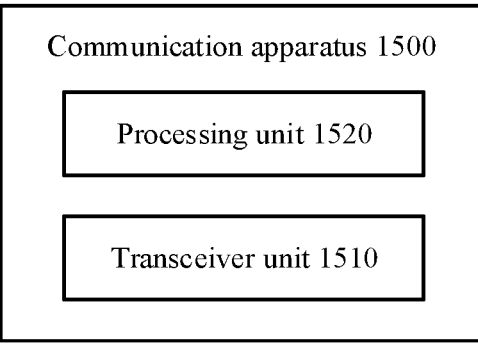
FIG. 15 is a schematic diagram of a communication apparatus according to an embodiment of this application.

FIG. 15 is a schematic block diagram of a communication apparatus 1500 according to an embodiment of this application. As shown in the figure, the apparatus 1500 may include a transceiver unit 1510 and a processing unit 1520. The transceiver unit 1510 may communicate with the outside, and the processing unit 1520 is configured to process data. The transceiver unit 1510 may also be referred to as a communication interface or a communication unit.

In a possible design, the apparatus 1500 may implement the steps or procedures performed by the network device #1 in the foregoing embodiment, for example, may be the network device #1, or a chip or circuit configured in the network device #1. The transceiver unit 1510 is configured to perform a sending/receiving-related operation on the network device #1 side in the foregoing embodiment, and the processing unit 1520 is configured to perform a processing-related operation of the network device #1 in the foregoing embodiment.

In an embodiment, the apparatus 1500 may implement steps or procedures performed by the network device #1 in the method 700 in embodiments of this application, and the apparatus 1500 may include units configured to perform the method performed by the network device #1 in the method 700 in FIG. 7. In addition, the units in the apparatus 1500 and the foregoing other operations and/or functions are respectively used to implement corresponding procedures of the method 700 in FIG. 7.

It should be understood that a specific process in which each unit performs the foregoing corresponding step has been described in detail in the foregoing embodiment. For brevity, details are not described herein again.

Figure 16:
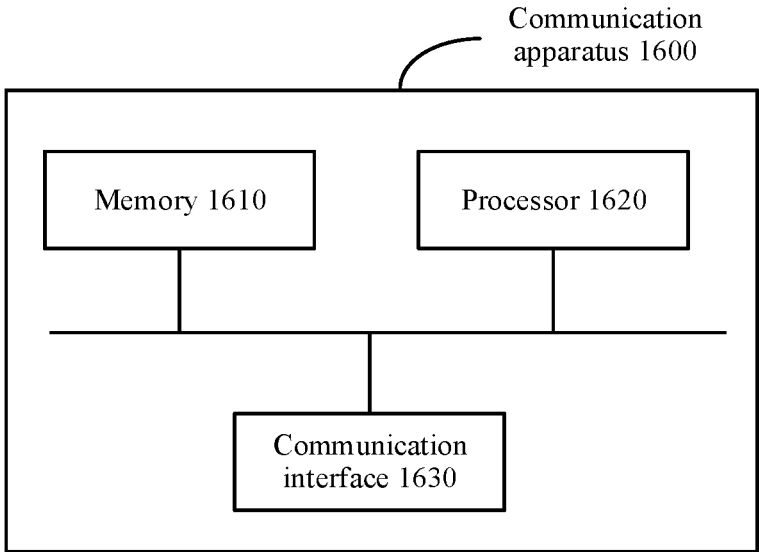
FIG. 16 is a schematic block diagram of a communication apparatus according to another embodiment of this application.

FIG. 16 is a schematic block diagram of a communication apparatus according to another embodiment of this application. The communication apparatus 1600 shown in FIG. 16 may include a memory 1610, a processor 1620, and a communication interface 1630. The memory 1610, the processor 1620, and the communication interface 1630 are connected through an internal connection path. The memory 1610 is configured to store instructions. The processor 1620 is configured to execute the instruction stored in the memory 1610. Optionally, the memory 1610 may be coupled to the processor 1620 through an interface, or may be integrated with the processor 1620.

It should be noted that the communication interface 1630 uses a transceiver apparatus, for example, but not limited to a transceiver, to implement communication between the communication apparatus 1600 and another device or a communication network. The communication interface 1630 may further include an input/output interface (input/output interface).

During implementation, the steps of the foregoing method can be implemented by using a hardware integrated logic circuit in the processor 1620 or instructions in a form of software. The method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1610, and the processor 1620 reads information in the memory 1610, and completes the steps of the foregoing method in combination with hardware thereof. To avoid repetition, details are not described herein again.

It should be understood that, the processor in embodiments of this application may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should also be understood that in embodiments of this application, the memory may include a read-only memory and a random access memory, and provide instructions and data to the processor. A part of the processor may further include a non-volatile random access memory. For example, the processor may further store information of a device type.

Figure 17:
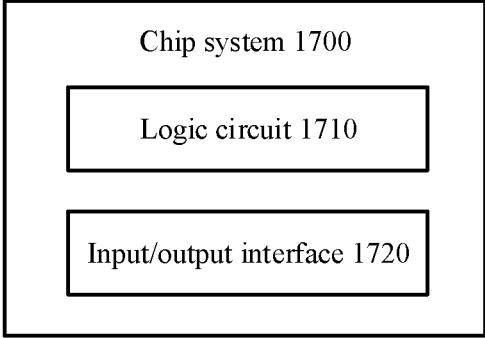
FIG. 17 is a schematic diagram of a chip system according to an embodiment of this application.

FIG. 17 is a schematic diagram of a chip system according to an embodiment of this application. The chip system 1700 shown in FIG. 17 includes a logic circuit 1710 and an input/output interface 1720. The logic circuit is configured to be coupled to an input interface, and transmit data through the input/output interface, to perform the method in FIG. 7.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field programmable gate array (FPGA), an application-specific integrated chip (application-specific integrated circuit, ASIC), a system on chip (SoC), a central processing unit (CPU), a network processor (NP), a digital signal processing (DSP) circuit, a micro controller unit (MCU), a programmable controller (programmable logic device, PLD), or another integrated chip.

In an embodiment process, steps in the foregoing method can be implemented by using a hardware integrated logic circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing method in combination with hardware thereof. To avoid repetition, details are not described herein again.

It should be noted that, the processor in embodiments of this application may be an integrated circuit chip, and has a signal processing capability. During implementation, steps in the foregoing method embodiments can be implemented by using a hardware integrated logic circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component, and may implement or perform the method, the steps, and logical block diagrams that are disclosed in embodiments of this application. The general-purpose processor may be a microprocessor, or the processor may be any conventional processor or the like. Steps of the method disclosed with reference to embodiments of this application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing method in combination with hardware thereof.

It may be understood that the memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another appropriate type.

According to the method provided in embodiments of this application, this application further provides a computer program product. The computer program product includes computer program code. When the computer program code is run on a computer, the computer is enabled to perform the method in any one of the embodiments shown in the method 700.

According to the method provided in embodiments of this application, this application further provides a computer-readable medium. The computer-readable medium stores program code. When the program code is run on a computer, the computer is enabled to perform the method in any one of the embodiments shown in the method 700.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid state disc (SSD)), or the like.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
generating, by a first network device, a node identifier, wherein the node identifier comprises a global part and a local part, the global part is determined based on geographical location information of a region covered by a second network device in which a node is located, and the local part is determined based on identity information of a terminal device associated with the node; and
sending, by the first network device, the node identifier to the terminal device,
wherein the geographical location information of the region is determined based on geographical location information of N access network devices that satisfy a preset condition in the region, and the preset condition is that the access network device always exists within a predefined time, wherein N is a positive integer, and
wherein the geographical location information of the region comprises geographical coordinates, and the geographical coordinates comprise an average value of geographical coordinates of the N access network devices that satisfy the preset condition.

2. The method according to claim 1, wherein the geographical location information of the region comprises geographical location information of the second network device, and the geographical location information of the second network device comprises one or more of the following: a mobile country code, a mobile network code, an identifier of a geographical region in which the second network device is located, an identifier of a set to which the second network device belongs, and a serial number of the second network device in the set.

3. The method according to claim 1, wherein the method is applied in a communication system comprising a network service node (NSN) and a user service node (USN), the NSN communicates with the USN through an external interface, the NSN comprises an authentication functional entity and/or a session management functional entity, the USN is associated with the terminal device, the USN comprises the following functional entities: a data forwarding functional entity, a session management functional entity, and a user data management functional entity, and the functional entities comprised in the USN communicate with each other through an internal interface; and
the node is the USN, and the node identifier is an identifier of the USN node.

4. The method according to claim 3, wherein the identifier of the USN node is used in a process of identification between the terminal device and the USN node.

5. The method according to claim 1, wherein the global part of the node identifier identifies the second network device.

6. The method according to claim 1, wherein the identity information of the terminal device comprises any one of the following: an internet protocol (IP) address, a port number, an application identifier, an international mobile subscriber identity, a subscription permanent identifier, and a phone number.

7. The method according to claim 1, wherein the second network device is a device in mobile edge computing (MEC).

8. A communication apparatus, comprising a transceiver and a processor, wherein
the processor is configured to generate a node identifier, wherein the node identifier comprises a global part and a local part, the global part is determined based on geographical location information of a region covered by a second network device in which a node is located, and the local part is determined based on identity information of a terminal device associated with the node; and
the transceiver is configured to send the node identifier to the terminal device,
wherein the geographical location information of the region is determined based on geographical location information of N access network devices that satisfy a preset condition in the region, and the preset condition is that the access network device always exists within a predefined time, wherein N is a positive integer, and
wherein the geographical location information of the region comprises geographical coordinates, and the geographical coordinates comprise an average value of geographical coordinates of the N access network devices that satisfy the preset condition.

9. The communication apparatus according to claim 8, wherein the geographical location information of the region comprises geographical location information of the second network device, and the geographical location information of the second network device comprises one or more of the following: a mobile country code, a mobile network code, an identifier of a geographical region in which the second network device is located, an identifier of a set to which the second network device belongs, and a serial number of the second network device in the set.

10. The communication apparatus according to claim 8, wherein the communication apparatus is a network service node (NSN) in a communication system comprising the NSN and a user service node (USN), the NSN communicates with the USN through an external interface, the NSN comprises an authentication functional entity and/or a session management functional entity, the USN is associated with the terminal device, the USN comprises the following functional entities: a data forwarding functional entity, a session management functional entity, and a user data storage functional entity, and the functional entities comprised in the USN communicate with each other through an internal interface; and
the node is the USN, and the node identifier is an identifier of the USN node.

11. The communication apparatus according to claim 10, wherein the identifier of the USN node is used in a process of identification between the terminal device and the USN node.

12. The communication apparatus according to claim 8, wherein the global part of the node identifier identifies the second network device.

13. The communication apparatus according to claim 8, wherein the identity information of the terminal device comprises any one of the following: an internet protocol (IP) address, a port number, an application identifier, an international mobile subscriber identity, a subscription permanent identifier, and a phone number.

14. The communication apparatus according to claim 8, wherein the second network device is a device in mobile edge computing (MEC).

15. A communication apparatus, comprising at least one processor, wherein the at least one processor is configured to execute computer instructions stored in a memory, so that the communication apparatus implements the method according to claim 1.

16. A chip system, comprising a logic circuit, wherein the logic circuit is configured to be coupled to an input/output interface, and transmit data through the input/output interface, to perform the method according to claim 1.

17. A communication method applied in a communication system comprising a network service node (NSN) and a user service node (USN), the NSN communicates with the USN through an external interface, the NSN comprises an authentication functional entity and/or a session management functional entity, the method comprising:

generating, by a first network device, a node identifier, wherein the node identifier comprises a global part and a local part, the global part is determined based on geographical location information of a region covered by a second network device in which a node is located, and the local part is determined based on identity information of a terminal device associated with the node; and sending, by the first network device, the node identifier to the terminal device, wherein the USN is associated with the terminal device, the USN comprises the following functional entities: a data forwarding functional entity, a session management functional entity, and a user data management functional entity, and the functional entities comprised in the USN communicate with each other through an internal interface; and the node is the USN, and the node identifier is an identifier of the USN node.

18. The method according to claim 17, wherein the identifier of the USN node is used in a process of identification between the terminal device and the USN node.

\* \* \* \* \*